(12) United States Patent
Radhakrishnan et al.

(10) Patent No.: US 10,331,463 B2
(45) Date of Patent: Jun. 25, 2019

(54) DYNAMIC ROLE-BASED VIEW DEFINITIONS IN A REPOSITORY SYSTEM

(71) Applicant: Oracle International Corporation, Redwood Shores, CA (US)

(72) Inventors: Radhesh Radhakrishnan, Kerala (IN); David Keyes, Clinton, OH (US)

(73) Assignee: Oracle International Corporation, Redwood Shores, CA (US)

( * ) Notice: Subject to any disclaimer, the term of this patent is extended or adjusted under 35 U.S.C. 154(b) by 397 days.

(21) Appl. No.: 15/382,699

(22) Filed: Dec. 18, 2016

(65) Prior Publication Data

US 2017/0097832 A1    Apr. 6, 2017

Related U.S. Application Data

(63) Continuation of application No. 14/488,099, filed on Sep. 16, 2014, now Pat. No. 9,544,198.

(60) Provisional application No. 61/880,816, filed on Sep. 20, 2013.

(51) Int. Cl.
*G06F 3/048* (2013.01)
*G06F 9/451* (2018.01)
*H04L 12/24* (2006.01)
*G06F 16/9535* (2019.01)
*G06F 3/0482* (2013.01)
*G06F 17/24* (2006.01)

(52) U.S. Cl.
CPC .............. *G06F 9/451* (2018.02); *G06F 3/048* (2013.01); *G06F 3/0482* (2013.01); *G06F 16/9535* (2019.01); *G06F 17/248* (2013.01); *H04L 41/22* (2013.01)

(58) Field of Classification Search
CPC ...... G06F 9/451; G06F 16/9535; G06F 3/048; G06F 3/0482; G06F 17/248; H04L 41/22
See application file for complete search history.

(56) References Cited

U.S. PATENT DOCUMENTS

| 6,182,068 | B1 | 1/2001 | Culliss |
| 8,521,778 | B2 | 8/2013 | James et al. |
| 8,768,902 | B2 * | 7/2014 | Aitken ............... G06F 17/00 707/703 |
| 8,937,618 | B2 | 1/2015 | Erez et al. |

(Continued)

OTHER PUBLICATIONS

U.S. Appl. No. 14/488,099, "Notice of Allowance", dated Aug. 30, 2016, 15 pages.

*Primary Examiner* — David Phantana-angkool
(74) *Attorney, Agent, or Firm* — Kilpatrick Townsend & Stockton LLP

(57) ABSTRACT

The present disclosure relates generally to techniques for displaying information in a repository system. In certain embodiments, techniques are described for dynamically determining a view, based on a role of a user, to display information stored in a repository system about one or more objects in a computing environment. An object can include an application, a process, a service, an endpoint device, a method, etc., which can exist in a computing environment. An object can include a resource (e.g., a data structure or a database) in a computing environment. The repository system can store information about an object and its attributes. The information stored in the repository system about an object can be dynamically displayed to a user based on the role associated with the user.

20 Claims, 14 Drawing Sheets

(56) References Cited

U.S. PATENT DOCUMENTS

| | | |
|---|---|---|
| 9,026,935 B1 | 5/2015 | Rasmussen et al. |
| 9,058,323 B2 | 6/2015 | Le et al. |
| 9,146,986 B2 | 9/2015 | Dunn et al. |
| 9,278,285 B2 | 3/2016 | Yuan |
| 9,348,924 B2 | 5/2016 | Somekh et al. |
| 9,544,198 B2 | 1/2017 | Radhakrishnan et al. |
| 9,860,690 B2 * | 1/2018 | Bak .................. H04W 4/02 |
| 9,996,559 B2 * | 6/2018 | Kientz ................ G06F 16/21 |
| 2003/0020751 A1 | 1/2003 | Safa et al. |
| 2009/0083636 A1 | 3/2009 | Troiano et al. |
| 2013/0155068 A1 | 6/2013 | Bier et al. |
| 2014/0006452 A1 | 1/2014 | Gilmour et al. |
| 2015/0089385 A1 | 3/2015 | Radhakrishnan et al. |

* cited by examiner

DYNAMIC ROLE-BASED VIEW DEFINITIONS IN A REPOSITORY SYSTEM

CROSS-REFERENCES TO RELATED APPLICATIONS

This application is a continuation of, and claims benefit and priority to U.S. Non-Provisional patent application Ser. No. 14/488,099, filed Sep. 16, 2014 and entitled "DYNAMIC ROLE-BASED VIEW DEFINITIONS IN A REPOSITORY SYSTEM," which claims benefit and priority to U.S. Provisional Patent Application No. 61/880,816, filed Sep. 20, 2013 and entitled "DYNAMIC ROLE-BASED VIEW DEFINITIONS IN A REPOSITORY SYSTEM." The entire contents of each of the above-identified patent applications are incorporated by reference herein.

TECHNICAL FIELD

The present disclosure relates generally to computing systems and more generally to techniques for displaying information stored in a repository system.

BACKGROUND

Repository systems can perform various functions including storing and managing information about objects (e.g., an application, a process, a service, or an endpoint) in a computing environment. The information stored in a repository system can be displayed in many different ways. In organizations that have many users accessing a repository system to view information about objects, many different roles are generally defined and assigned to the users for viewing the information. In response to a user request to view information stored in the repository system, the type of information and the manner in which that information is displayed to the user can vary based on the role(s) associated with the user when the user requests to view such information stored in the repository system. The content and the type of information viewable by a user in a role even varies between the roles defined in the repository system.

To display information in a repository system to different users associated with different roles, preferences are typically configured for individual users and are used to determine the information shown to the users. The preferences for a user may be managed in a profile or a persona and are used to determine criteria for displaying information stored in a repository system to the user. Each profile is administered individually to adjust the manner in which information is presented to a user with respect to that user's role. As such, a profile or a persona for each user may be have to be managed individually to control presentation of information in a repository based on the role(s) associated with the user.

BRIEF SUMMARY

The present disclosure relates generally to techniques for displaying information stored in a repository system. In certain embodiments, dynamic views are used to determine what information stored in the repository system is to be displayed to a user and the manner in which the information is to be displayed.

In certain embodiments, a repository system may store information for various objects and their associated metadata such as attributes of the objects. An object may correspond to an application, a process, a service, an endpoint device, a resource (e.g., a database or a data structure), a method, etc., which can exist in a computing environment. An object can include a resource (e.g., a data structure or a database) in a computing environment. Information stored in the repository system about an object can be dynamically displayed to a user based on the role associated with the user. In one embodiment, a view is dynamically determined based on a role of the user and the view is then displayed to the user. Information is displayed to the user based on the determined view and the view indicates the manner in which the information is displayed to the user.

In certain embodiments, the repository system can store information about objects including their attributes in various different data structures (or "entities"). An entity may include without restriction a linked list, a record, a hash table, an array, any data structure, or the like. Information about an object may be stored in one or more entities within the repository. A single entity may store information about one or more objects in a computing environment. An entity may be associated with an entity type, which corresponds to one or more types of objects. A type of an object may be based on an attribute of an object, a function associated with an object, information about the object, a group to which an object belongs, or combinations thereof. The repository system can retrieve at least one entity based on an object and/or a type of object requested by a user.

In certain embodiments, a user may send a request to the repository system requesting information for an object or object type. In response, the repository system may configured to identify one or more entities storing information for the requested object or type of object. Information stored by the retrieved one or more entities may then be displayed to the user based on a role associated with a user. Information may be dynamically displayed by being presented in a format based on the role of the user requesting the information. The user's role (i.e., the role associated with the requesting user) determines what information from the determined one or more entities the requesting user is permitted to view. Accordingly, a right to view information stored in an entity corresponding to an object or object type may be defined based on a user's role. The right may be defined for a role with respect to an object, one or more attributes of an object, and/or a type of an object.

A role is thus used to determine what information in a repository system to display to a user and how to display the information. In certain embodiments, one or more viewing rights can be associated with a role. A user associated with a particular role has the viewing rights associated with that particular role. A user can be associated with one or more roles. Examples of roles may include a developer, an architect, a guest, an integrator, or a leader. In some embodiments, a user may indicate a preference for a default role when accessing the repository system. In some embodiments, a default role may be defined for the repository system and the default role may be assigned to a user (or the user may indicate a preference for the default role) when accessing the repository system. In some embodiments, a role may be associated with a user based on particular functions and/or operations performed using the repository system.

In some embodiments, information that can be viewed by a role associated with a user may be dynamically displayed in a particular manner (e.g., layout, arrangement, format, style, or the like) for the role. By dynamically determining, based on a user's role, a view of information in the repository system, the information displayed to a user may be displayed in a manner that is useful to the role. The view of information may improves the user's ability and visualize objects that exist in a computing environment in a manner useful to the role. A view determined dynamically based on a user's role further reduces a burden on managing profiles or personas for each individual user and enables the repository system to determine the type of information about an object that may be relevant a user associated with a particular role.

There are various ways in which roles may be assigned to users. In one embodiment, assignments may be done by a system administrator of the repository system or of the computing environment of which the repository system is a part. In some embodiments, a role may be assigned to a user based on particular functions and/or operations performed using the repository system.

In some embodiments, a role associated with a user not only determines what information the user is permitted to view but also determines the manner in which the information is displayed to the user. For example, a role associated with a requesting user may determine the layout, arrangement, format, style, etc. used for displaying the information to the user.

By determining, based on a user's role, a view of information in the repository system, the information displayed to a user may be displayed in a manner that is useful to the role. The view of information may improves the user's ability and visualize objects that exist in a computing environment in a manner useful to the role. A view determined dynamically based on a user's role further reduces a burden on managing profiles or personas for each individual user and enables the repository system to determine the type of information about an object that may be relevant a user associated with a particular role.

In certain embodiments, a repository system may use one or more view definition records to dynamically determine a view to display to a user. A view definition record can be associated with one or more different roles for accessing the repository system. A view definition record may indicate the types of objects and/or the information about an object that can be displayed to a user associated with a role. A view definition record can identify a layout for displaying, to a user associated with one or more roles, information in an entity corresponding to an object. A view definition record can identify functions and/or operations that can be performed by the one or more roles with respect to the entity.

In certain embodiments, a view definition record can indicate one or more related types of entities for which information can be displayed to a user associated with a particular role. A type of an entity may correspond to a type of object. The view definition record can be dynamically customized by a user with a particular role, e.g., an administrator, who has access to managing and creating a view definition record. The role may not correspond to any of the roles indicates by the view definition record. The view definition record can indicate one or more user interface formats for displaying information in an entity to a user having a role associated with the view definition record. This is different from conventional techniques in which the information to be displayed to a user has to be determined upon the individual user's profile, which can vary from user to user. The user interface format (e.g., user interface layouts and/or user interface components) used to determine a manner by which to present information to a user may enable information to be presented in a similar format to users associated with a particular role.

Some embodiments can perform one or more techniques for dynamically determining a view to display about information corresponding to an object in a computing environment. One such technique can be a method, which can be performed by a computing system or a computing device. The computing system or the computing device may implement a repository system or may be associated with a repository system. The method includes retrieving from a repository system, an entity corresponding to an object. The object may be indicated in a request by a user to display information about the object. The method includes determining a type of object associated with the object. In some embodiments, the method may include retrieving a plurality of entities corresponding to a type of object. The type of object may be indicated in a request by a user to display information about one or more objects associated with the type of object. The method includes determining a role associated with the user. The method includes identifying, based on the type of object, a view definition record. The view definition record may indicate a type of information to display from an entity based on the type of object. The view definition record may identify a user interface format for displaying the type of information to a particular role. The method includes determining, based on the view definition record, whether the determined role matches the particular role. The method includes, upon determining that the determined role matches the particular role, retrieving the identified user interface format. In some embodiments, the method includes retrieving criteria from the identified view definition record. The criteria may indicate the type of information to display from an entity for the type of object. In some embodiments, the method includes identifying information to display from an entity of the plurality of entities. The information may be identified based on the criteria. The method includes retrieving the identified user interface format when the particular role matches the determined role associated with the user. The method includes generating a graphical user interface to display information corresponding to the type of information from the retrieved entity. The graphical user interface may be generated based on the retrieved user interface format. In some embodiments, the graphical user interface format is generated to display the information identified from an entity of the plurality of entities. The method includes displaying the generated graphical user interface. In some embodiments, the method includes upon determining that the determined role of the user does not match the particular role: identifying, based on the type of object, a default view definition record, where the default view definition record indicates a default type of information to display from an entity based on the type of object, and where the default view definition record identifies a default user interface format for displaying the default type of information; retrieving the identified default user interface format; and generating a graphical user interface to display information corresponding to the default type of information from the retrieved entity, where the graphical interface is generated based on the retrieved default user interface format.

In certain embodiments, the method performed by the computing system further includes retrieving criteria from the identified view definition record, where the criteria indicates the type of information to display from an entity for the type of object.

In certain embodiments, the method performed by the computing system further includes retrieving an additional user interface format identified based on information in an additional view definition record associated with an additional type of object. The additional type of object may be associated with the object. The additional type of object may be different from the type of object. The graphical user interface may be generated to display the information included in an additional entity corresponding to the object. The object may be associated with the additional type of object. The graphical user interface may be generated using the retrieved user interface format and the retrieved additional user interface format.

In certain embodiments, the method performed by the computing system further includes determining, using the identified view definition record, a relationship between the additional type of object and the type of object and identifying the additional view definition record based on the relationship between the additional type of object and the type of object.

In certain embodiments, the method performed by the computing system further includes receiving information indicating a change in the role of the user to a new role, determining that the new role associated with the user does not match the particular role, and updating the generated graphical user interface to display information corresponding to the type of information from the retrieved entity. The generated graphical user interface may be updated using a new user interface format.

In certain embodiments, the method performed by the computing system further includes identifying, based on the type of object, a new view definition record to display information from the retrieved entity to the new role and retrieving the new user interface format identified by the new view definition record.

The following detailed description together with the accompanying drawings will provide a better understanding of the nature and advantages of embodiments of the present invention.

DETAILED DESCRIPTION

Figure 1:
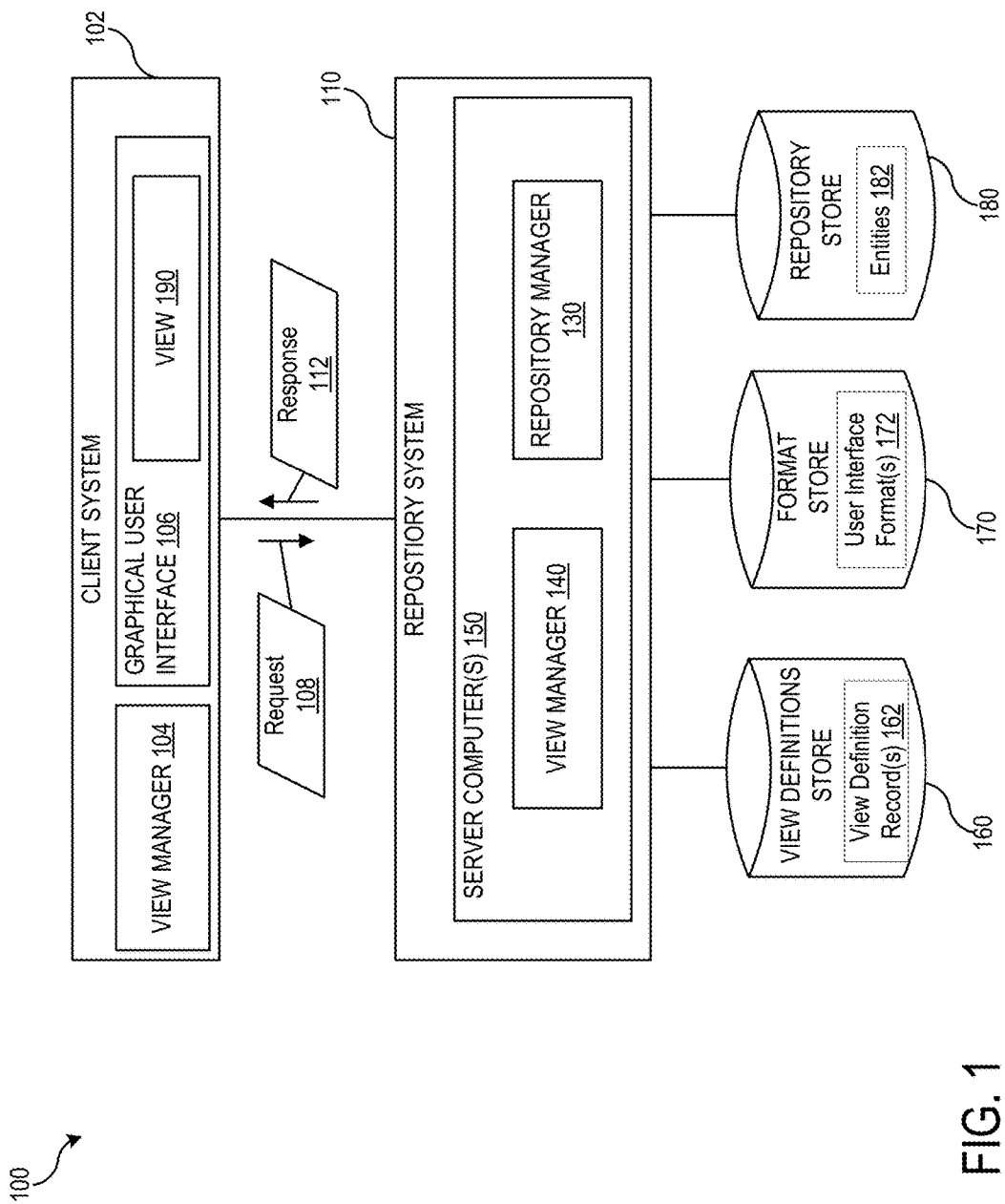
FIG. 1 shows a computing environment according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The present disclosure relates generally to techniques for displaying information stored in a repository system. In certain embodiments, dynamic views are used to determine what information stored in the repository system is to be displayed to a user and the manner in which the information is to be displayed.

In certain embodiments, a repository system may store information for various objects and their associated metadata such as attributes of the objects. An object may correspond to an application, a process, a service (e.g., a composite service), an endpoint device (e.g., a terminal computer), a resource (e.g., a database or a data structure), a method, etc., which can exist in a computing environment. An object can include a resource (e.g., a data structure or a database) in a computing environment. Information stored in the repository system about an object can be dynamically displayed to a user based on the role associated with the user. In one embodiment, a view is dynamically determined based on a role of the user and the view is then displayed to the user. Information is displayed to the user based on the determined view and the view indicates the manner in which the information is displayed to the user.

In certain embodiments, the repository system can store information about objects including their attributes in various different data structures (or "entities"). An entity may include without restriction a linked list, a record, a hash table, an array, any data structure, or the like. Information about an object may be stored in one or more entities within the repository. A single entity may store information about one or more objects in a computing environment. An entity may be associated with an entity type, which corresponds to one or more types of objects. A type of an object may be based on an attribute of an object, a function associated with an object, information about the object, a group to which an object belongs, or combinations thereof. The repository system can retrieve at least one entity based on an object and/or a type of object requested by a user.

In certain embodiments, a user may send a request to the repository system requesting information for an object or object type. In response, the repository system may be configured to identify one or more entities storing information for the requested object or type of object. Information stored by the retrieved one or more entities may then be displayed to the user based on a role associated with a user. Information may be dynamically displayed by being presented in a format based on the role of the user requesting the information. The user's role (i.e., the role associated with the requesting user) determines what information from the determined one or more entities the requesting user is permitted to view. Accordingly, a right to view information stored in an entity corresponding to an object or object type may be defined based on a user's role. The right may be defined for a role with respect to an object, one or more attributes of an object, and/or a type of an object.

A role is thus used to determine what information in a repository system to display to a user and how to display the information. In certain embodiments, one or more viewing rights can be associated with a role. A user associated with a particular role has the viewing rights associated with that particular role. A user can be associated with one or more roles. Examples of roles may include a developer, an architect, a guest, an integrator, or a leader. In some embodiments, a user may indicate a preference for a default role when accessing the repository system. In some embodiments, a default role may be defined for the repository system and the default role may be assigned to a user (or the user may indicate a preference for the default role) when accessing the repository system. In some embodiments, a role may be associated with a user based on particular functions and/or operations performed using the repository system.

In some embodiments, information that can be viewed by a role associated with a user may be dynamically displayed in a particular manner (e.g., layout, arrangement, format, style, or the like) for the role. By dynamically determining, based on a user's role, a view of information in the repository system, the information displayed to a user may be displayed in a manner that is useful to the role. The view of information may improves the user's ability and visualize objects that exist in a computing environment in a manner useful to the role. A view determined dynamically based on a user's role further reduces a burden on managing profiles or personas for each individual user and enables the repository system to determine the type of information about an object that may be relevant a user associated with a particular role.

There are various ways in which roles may be assigned to users. In one embodiment, assignments may be done by a system administrator of the repository system or of the computing environment of which the repository system is a part. In some embodiments, a role may be assigned to a user based on particular functions and/or operations performed using the repository system.

In some embodiments, a role associated with a user not only determines what information the user is permitted to view but also determines the manner in which the information is displayed to the user. For example, a role associated with a requesting user may determine the layout, arrangement, format, style, etc. used for displaying the information to the user.

By determining, based on a user's role, a view of information in the repository system, the information displayed to a user may be displayed in a manner that is useful to the role. The view of information may improves the user's ability and visualize objects that exist in a computing environment in a manner useful to the role. A view determined dynamically based on a user's role further reduces a burden on managing profiles or personas for each individual user and enables the repository system to determine the type of information about an object that may be relevant a user associated with a particular role.

In certain embodiments, a repository system may use one or more view definition records to dynamically determine a view to display to a user. A view definition record can be associated with one or more different roles for accessing the repository system. A view definition record may indicate the types of objects and/or the information about an object that can be displayed to a user associated with a role. A view definition record can identify a layout for displaying, to a user associated with one or more roles, information in an entity corresponding to an object. A view definition record can identify functions and/or operations that can be performed by the one or more roles with respect to the entity.

In certain embodiments, a view definition record can indicate one or more related types of entities for which information can be displayed to a user associated with a particular role. A type of an entity may correspond to a type of object. The view definition record can be dynamically customized by a user with a particular role, e.g., an administrator, who has access to managing and creating a view definition record. The role may not correspond to any of the roles indicates by the view definition record. The view definition record can indicate one or more user interface formats for displaying information in an entity to a user having a role associated with the view definition record. This is different from conventional techniques in which the information to be displayed to a user has to be determined upon the individual user's profile, which can vary from user to user. The user interface format (e.g., user interface layouts and/or user interface components) used to determine a manner by which to present information to a user may enable information to be presented in a similar format to users associated with a particular role.

FIG. 1 shows a computing environment 100 according to an embodiment of the present invention. It should be appreciated that various different system configurations are possible, which can be different from the computing environment 100. The embodiment shown in FIG. 1 is thus one example of a computing system for implementing an embodiment of the invention and is not intended to be limiting. For purposes of illustration, specific embodiments are described herein for techniques for dynamically determining a view, based on a role of a user, to display information about resources and/or objects in a computing environment.

The computing environment 100 can include a client system 102, a repository system 110, and one or more data stores. The data stores can include a view definitions store 160, a format store 170, and a repository store 180. The client system 102 and the repository system 110 can be implemented in different computing systems or a single computing system. The client system 102 and the repository system 110 can communicate with each other via a communication network (not shown). Examples of communication networks can include the Internet, a mobile network, a wireless network, a cellular network, a local area network (LAN), a wide area network (WAN), other communication networks, or combinations thereof.

The client system 102 can include a computing system or a computing device. For example, the client system 102 can be implemented in a personal digital assistant (PDA), a tablet computer, a laptop computer, a desktop computer, a wearable computer, a pager, etc. The client system 102 can include one or more memory storage devices and one or more processors. A memory storage device can be accessible to the processor(s) and can include instructions stored thereon that, when executed by the processor(s), cause the processor(s) to implement one or more operations disclosed herein. In various embodiments, the client system 102 can be configured to execute and operate a client application such as a web browser, proprietary client applications, or the like. The client applications can be accessible or operated via one or more network(s).

The client system 102 can be configured to communicate one or more requests (e.g., a request 108) to the repository system 110. A request can indicate at least one object or a type of object for which to display information (e.g., metadata) stored by the repository system 110. A request can be received from a user in response to interaction with the client system 102. The client system 102 can receive one or more responses (e.g., a response 112) from the repository system 110. A response can include information about one or more objects requested by a user. The information about an object can include one or more attributes about the object. An attribute about an object can indicate information such as a location of the object in the computing environment, an identifier of the object, a type of the object, and/or a relationship to other types of objects.

In certain embodiments, the client system 102 can display a graphical user interface (GUI) (e.g., a GUI 106). A GUI can facilitate access to information from the repository system 110. The GUI 106 can display a view 190 including one or more additional GUIs. The view 190 can enable a user to specify criteria for the request 108, such as an object or a type of object for which information is being requested from the repository system. The view 190 can enable users to search, browse, view, or edit information managed by the repository system 110. The information displayed in the view 190 can display information including attributes about objects stored by the repository system.

The responses 112 received by the client system 102 can include one or more UI elements and/or one or more GUIs to present the view 190. In some embodiments, a response 112 can include one or more UI formats and/or UI elements, which can be used to dynamically generate the view 190. Dynamic generation of the view 190 is described below and further with reference to FIGS. 2, 4, 5, and 6. The view 190 can be generated based on a role associated with the user that sends a request (e.g., the request 108) to the repository system 110. The view 190 can be displayed to present information about objects stored in the repository system 110. In certain embodiments, information about an object may be chosen to be displayed based on a role associated with a user.

A right to view information about an object may be defined based on a user's role. The right may be defined for a role with respect to an object, one or more attributes of an object, and/or a type of an object. A role may be a way by which to manage information corresponding to objects displayed from a repository system. One or more viewing rights can be associated with a role. A role can then be associated or assigned to a user requesting information from the repository system. A user can be assigned or associated with multiple roles. The information about the objects displayed in the view 190 can be accessible based on users associated with one or more roles enabling access to the information about an object. Examples of roles may include a developer, an architect, a guest, an integrator, a leader, an administrator, a tester, or other types of roles for accessing the repository system 110.

The repository system 110 can include a computing system or a computing device. The repository system can be implemented using hardware, firmware, software, or combinations thereof. The repository system 110 can manage access to and retrieval of information stored in one or more data stores, e.g., the view definitions store 160, the format store 170, or the repository store 180. In certain embodiments, the repository system 110 can be implemented with one or more computing devices, e.g., a server computer 150, which can perform operations for the repository system 110.

In certain embodiments, the server computer 150 can be configured to support deployment of different types of applications to one or more client systems (e.g., the client system 102) in a distributed manner. For example, the server computer 150 can support the execution of one or more applications, which can be accessed by one or more client systems, e.g., the client system 102. The applications can be provided to the client system 102 to enable a user to operate the repository system 110. The one or more applications can be accessed and operated via the GUI 106. In certain embodiments, the server computer 150 can exchange communication with the client system 102 to provide the client system 102 with information about objects stored in the repository system 110.

The server computer 150 can implement a repository manager 130 to manage information in the repository store 180. The repository manager 130 can store and manage information about objects including their attributes in various different data structures 182 (or "entities"). An entity may include without restriction a linked list, a record, a hash table, an array, any data structure, or the like. Information about an object may be stored in one or more entities within the repository. A single entity may store information (e.g., attributes) about one or more objects in a computing environment. An attribute can include information such as a location of the object, an identifier of the object, a type of object, and/or a relationship to other objects or types of objects. An entity may be associated with an entity type, which corresponds to one or more types of objects. A type of an object may be based on an attribute of an object, a function associated with an object, information about the object, a group to which an object belongs, or combinations thereof. The repository system 110 can identify and retrieve an entity based on the object requested by a user.

In certain embodiments, the entities 182 can be managed in the repository store 180 based on a hierarchical metadata model derived from one or more formalized metadata models. The resource manager 130 can generate an entity corresponding to an object that is discovered or identified in a computing environment. In certain embodiments, the resource manager 130 can generate one or more entities 182 based on information about an object provided by a user via the client system 102.

In certain embodiments, the repository manager 130 can use the repository store 180 to store other information associated with the entities 182. For example, the repository manager 130 can store in the repository store 180 one or more data structures corresponding to an entity type. An entity type can correspond to a type of object and can store information (e.g., attributes) about the type of object. A structure of an entity can be based on one or more of the entity types. As such, an entity can store information corresponding to an entity type. The repository manager 130 can identify one or more entities for an object based on a type of the object corresponding to an entity type.

The repository manager 130 can process the requests 108 received from the client to obtain information about an object corresponding to an entity. The repository manager 130 can perform operations to access the repository store 180 based on the request 108. Access to the entities 182 can be based on the role of the user sending the request 108. The request 108 can include criteria indicating the objects for which the user is requesting information to be displayed in the view 190.

The server computer 150 can include or implement a view manager 140. The view manager 140 can generate and manage a view of information stored by the repository system 110. The view manager 140 can dynamically determine one or more views (e.g., the view 190) to be displayed in the GUI 106. The view 190 can be generated based on a view definition record 162. The view manager 140 can store and manage one or more view definition records 162 in the view definitions store 160. A view definition record can be a data structure, which can be without restriction a linked list, a record, a hash table, an array, any data structure, or the like. A view definition record 162 can include information to identify one or more UI formats 172 for dynamically generating the view 190 for entities having one or more entity types indicated in the request 108 from a user. In some embodiments, the view 190 can be dynamically generated by the view manager 140 and then communicated in the response 112 to the client system 102 for display in the GUI 106. In some embodiments, the repository system 110 can include, with the response 112, the view definition record 162 and the information about one or more entities 182 corresponding to an object requested by the user. The client system 102 can include a view manager 140 that can dynamically generate the view 190 based on the information included in the response 112.

A view definition record (e.g., any one of the view definition records 162) can include information indicating one or more UI formats 172 for displaying information in an entities having one or more of the entity types associated with the view definition record 162. A view definition record 162 can include a criterion, which may indicate one or more different roles permitted to view information generated for display using that view definition record 162. In some embodiments, a different view definition record can correspond to one or more roles, which are enabled to request information for an entity type. A view definition record can indicate one or more different UI formats 172 tailored for one or more roles. In this manner, different views based on an entity type can be displayed to a user based on a role associated with a user that requests information from the repository system 110. The repository system 110 can determine a specific UI format 172 to present users with information about an object stored in one or more entities. The format of a view definition record is described further below with reference to FIG. 3. In certain embodiments, one or more view definition records 162 can be generated based on information (e.g., criteria) received from a user (e.g., an administrator) or predefined criteria. For example, the criteria for a view definition record 162 can be received via a GUI, such as one or more of the GUIs described with reference to FIGS. 8-11.

The view manager 140 can manage and store one or more UI formats 172 in the format store 170. A UI format 172 can indicate one or more other attributes for displaying information stored in the repository store 180. A UI format 172 can include or indicate one or more UI elements or components to be displayed in a view 190 generated based on the UI format 172. The format store 170 can store one or more UI elements and/or components of the one or more UI formats 172. In some embodiments, the one or more UI elements/components can be identified by the view definition record 162. The format store 170 can store one or more default UI formats that can be used to generate the view 190.

The default UI formats can be used to generate the view 190 for any type of role and/or any entity type. The view manager 140 can use a default UI format to generate the view 190 upon determining that criteria for the UI formats 172 is not satisfied for information to be displayed for a requested object.

The present disclosure may alleviate a burden on administrators of a repository system by determining a view of information an object based on the role of a user and the object for which information is being requested. In doing so, an administrator of a repository system may not have to manage profiles and/or personas for individual users to determine the information to display from the repository system and the manner in which to display the information. By storing records (e.g., a view definition record), which may indicate a UI format for displaying information based on a relation between a type of an object and a type of role, customization of individual profiles or personas can be reduced or eliminated. Further, a view definition record can be easily modified by an administrator to add or remove different roles that presented with a view based on the view definition record. An administrator can modify or create a view definition record to provide a view for similar entity types, such as those, which can be displayed in a similar UI format. With little effort, an administrator can update a view definition record to add or remove roles and/or entity types to accommodate for frequent changes in roles and the types of information managed by the repository system.

Figure 2:
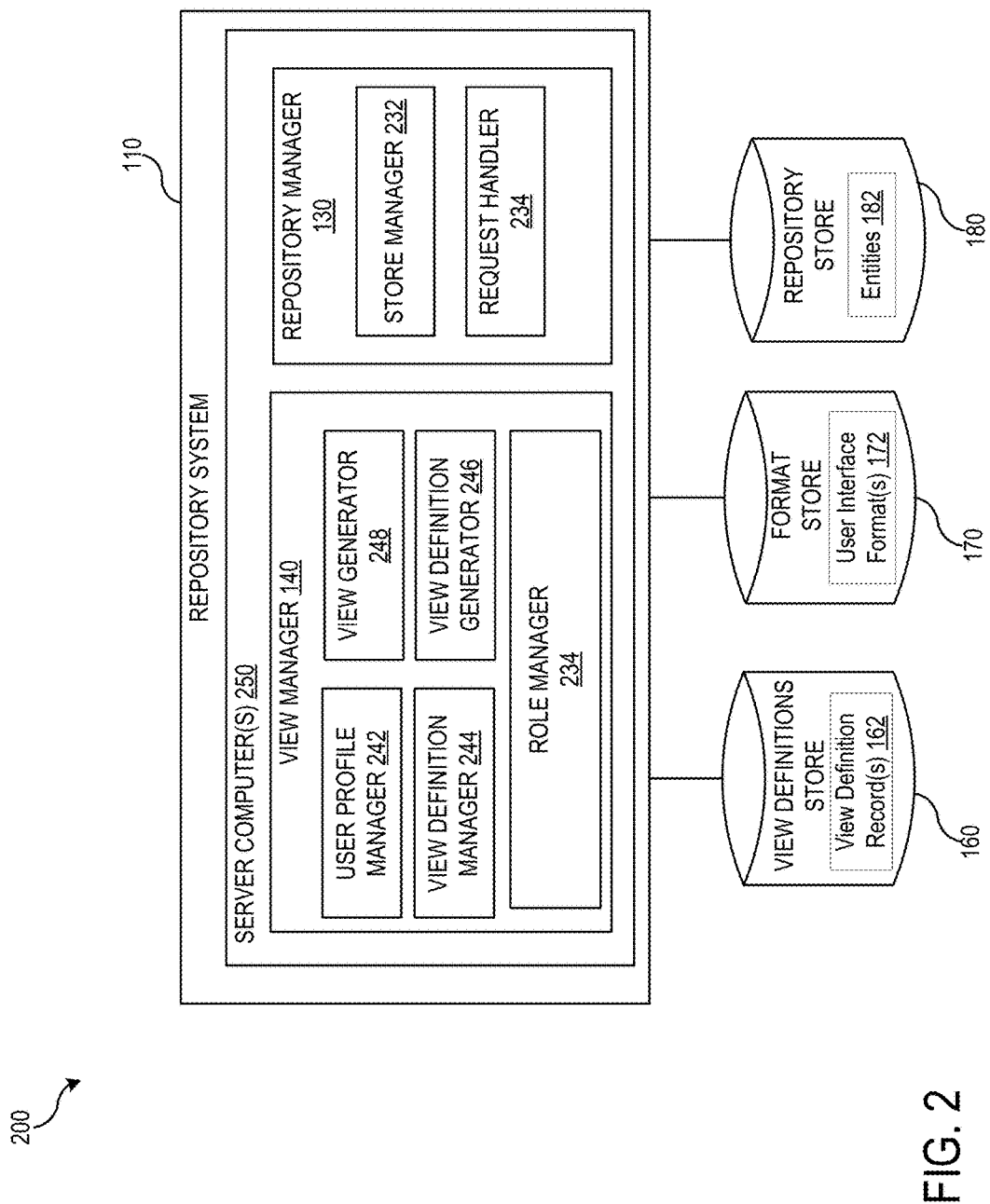
FIG. 2 shows a computing environment according to an embodiment of the present invention.

FIG. 2 shows a computing environment 200 according to one embodiment of the present invention. The computing environment 200 can include a repository system, e.g., the repository system 110. The repository system 110 can include the server computer 150. The repository system 110 can be coupled to the view definitions stores 160, the format store 170, and the repository store 180.

As explained above, the repository system 110 can dynamically determine a view to display information stored by the repository system 110 based on a role of a user accessing the repository system 110. The repository system 110 can be implemented as one or more functional blocks or modules configured to perform various operations for accessing information stored by the repository system 110. The repository manager 130 can include a store manager 232 to manage information about objects stored in one or more entities 182 in the repository store 180. The repository manager 130 can include a request handler 234 to manage requests received from a client system (e.g., the client system 102). The view manager 140 can include a user profile manager 242, a view definition manager 244, a view definition generator 246, a view generator 248, and a role manager 234.

The request handler 234 can manage receiving requests (e.g., the request 108) from a client system. The request handler can process a request and provide information to the store manager 232 to process a request for an entity.

The store manager 232 can manage (e.g., create, update, or delete) information (e.g., the entities 182) stored in the repository store 180 about objects that are discovered or identified in a computing environment. For example, the store manager can create, update, or delete one or more entity types for one or more of the entities 182. In certain embodiments, the entities 182 can be updated or deleted based on changes in the entities 182 themselves. In some embodiments, the store manager 232 can store information indicating relationships between the entity types. The entities 182 can be updated or deleted based on changes in the information stored in association with the entities 182. Such information may include entity types or relationships between entity types. The store manager 232 can retrieve information in an entity based on the object and/or a type of object requested by a user. The store manager 232 can retrieve information from an entity 182 in the repository store 180.

The view generator 248 can dynamically generate one or more views (e.g., the view 190) displayed in the GUI 106. A view (e.g., the GUI in FIG. 5) can display information about an object indicated by the request 108. The view generator 248 can generate a view of information for an object based on one or more view definition records 162 identified based on the object or the type of object requested by a user. The view generator 248 can generate the view for the object based on a view definition record that indicates a role of the user making the request 108. For an entity corresponding to a requested object, the view generator 248 can generate the view of information permitted for the role based on a criterion in the identified view definition record.

The role manager 234 can manage rights of a user associated with a role to view information stored by the repository system 110. For example, the role manager 234 can determine whether a user, based on a role associated with the user, has access to view information about an object stored in the repository system 110. The role manager 234 can determine the information about an object that can be viewed. In certain embodiments, a view definition record 162 may include a criterion that indicates one or more roles, which can view the information. In some embodiments, a view definition record 162 may indicate particular attributes that can be viewed by a role. Based on the criterion, the role manager 234 can determine whether a role associated with a user matches a role indicated by the criterion in the view definition record 162.

The user profile manager 242 can manage one or more profiles corresponding to one or more roles for viewing information in the repository system 110. A profile can indicate one or more roles for viewing information in the repository system 110. In some embodiments, a profile can indicate attributes for using the repository system 110. The user profile manager 242 can determine a role of the user based on a profile associated with the user. In some embodiments, each role can correspond to a user profile defined for that role.

In some embodiments, a view can include one or more of the GUIs (e.g., the GUIs in FIGS. 8-11) that enable a user (e.g., an administrator) to create, update, and/or delete a view definition record 162. In some embodiments, a view can includes a repository preferences GUI (e.g., the GUI in FIG. 7) to enable a user to select a profile corresponding to a role for operating the repository system 110. The selected profile may be used to determine the role of a user operating the repository system 110.

The view generator 248 can process one of the view definition records 162 to determine one or more UI formats 172 for displaying information in an entity corresponding to a requested object. In some embodiments, a UI format can be determined based on one or more data structures identified in a view definition record 162. In specific embodiments, a view definition record 162 can indicate one or more regions to present in a view of information corresponding to one or more entity types indicated in the view definition record 162. Each region can correspond to a task flow, which can indicate a set of activities that can be performed for the entity types displayed for the region. In some embodiments, the view definition record 162 can indicate one or more UI layouts to display information in each entity that are related to a requested entity type.

Based on the regions and associated layouts included on those regions, the view generator 248 can generate a view model used to generate a graphical user interface to display information about an object. A view model can provide a mapping that defines a UI format, which can be used to dynamically generate a view of information. The structure and format of a view definition record 162 is described below with reference to FIG. 3. In certain embodiments, determination of the view model and the mapping of the view model to a UI format are described with reference to FIGS. 4 and 5. In certain embodiments, the view generator 248 can generate all or a portion of the view 190 to be displayed by the GUI 106. One of ordinary skill in the art may appreciate that performance for generating the view 190 may be enhanced by generating all or a portion of the view at the client system 102.

In some embodiments, the view generator 248 can determine the UI elements and/or components to include in the view based on a selected one of the view definition records 162. The view definition record can indicate locations to UI elements (e.g., a widget, a control, a button, an input field, etc.) to be included in the dynamic view. The locations can correspond to one or more locations in a data store (e.g., the format store 170) that can contain UI elements. The UI elements in the data store can include locations of UI artifacts (e.g., a wrapper task flow, a page definition file, and/or a page fragment). The view definition record 162 can indicate the locations (e.g., a region) within a UI format to display the UI elements. In some embodiments, the UI elements in the selected view definition record can correspond to the functions associated with the region.

The view definition generator 246 can generate a view definition record 162 based on one or more criteria provided by a user through one or more GUIs (e.g., the GUIs in FIGS. 8-11). A criterion can indicate an attribute to be associated with a view. An attribute can be used to determine information in an entity that can be displayed. A criterion can indicate one or more entity types and/or one or more entities accessible to a user presented with a view displayed based on the view definition record 162. Information can be displayed based on the view definition record 162 for an entity that satisfies the criterion. In some embodiments, a criterion can indicate one or more roles that can access information displayed based on the entities that can be viewed according to the view definition record 162. A view definition record 162 can be generated in a format as described with reference to FIG. 3.

In some embodiments, a default view definition record can be created for one or more attributes that are chosen by default for a user having a particular role (e.g., a default role). The default view definition record can be used to display information included in an entity when no view definition record exists for displaying information in the entity. In some embodiments, the default view definition record can be created for a role (e.g., a default role) that a user can be assigned by default when accessing the repository system.

The view definition manager 244 can manage access to configure (e.g., create, read, update, and delete) one or more of the view definition records 162. In some embodiments, the view definition manager 244 can permit access to create, read, update, and/or delete one or more view definition records 162 based on a role of the user of the repository system 110. For example, the view definition manager 244 can permit an administrator to create and update view definition records 162. In such embodiments, certain roles may be permitted to prevent unauthorized users from creating, modifying, or deleting view definition records. In some embodiments, the view definition manager 244 may obtain information determined by the role manager 234 with respect to information in a view definition record 162 that can be accessed by a role associated with a user.

The view definition manager 244 can manage access to information stored in the view definition records 162. Upon receiving a request (e.g., the request 108) from a user, the view definition manager 244 can identify and retrieve view definition records 162. The view definition manager 244 can search the view definitions store 160 to identify a view definition record that is associated with an entity corresponding to an object requested by a user. The view definition manager 244 can analyze attributes and/or criterion in the view definition records in any order or any manner. The criterion may be analyzed to determine attributes about an object that can be displayed to a user associated with a role.

Figure 3:
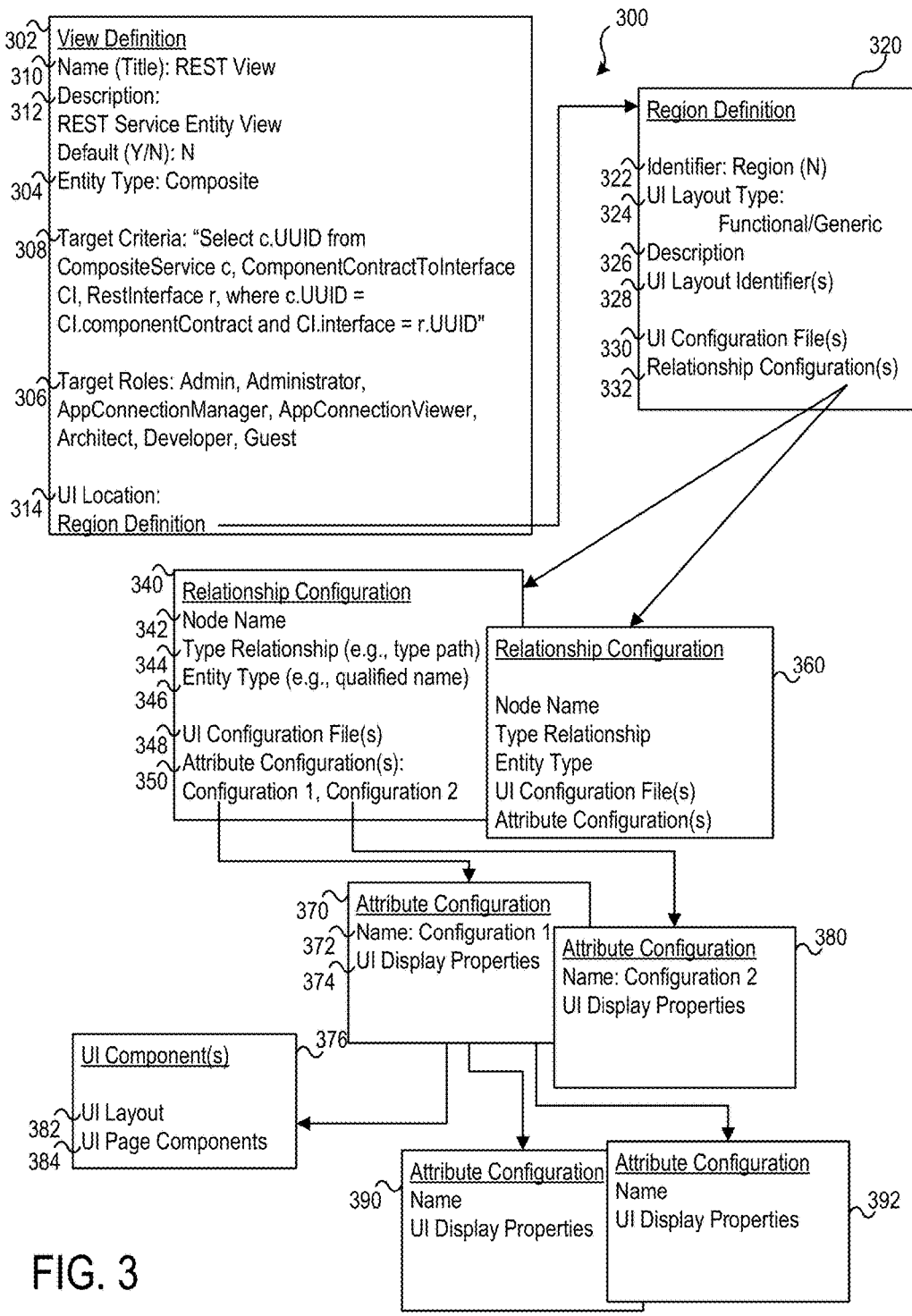
FIG. 3 shows a view definition record according to an embodiment of the present invention.

FIG. 3 shows a view definition record 300 according to an embodiment of the present invention. The view definition record 300 can be generated and managed by a repository system, e.g., the repository system 110 of FIG. 1. As explained above, a view definition record 300 can include information to indicate a UI format for dynamically generating a view (e.g., the view 190) of one or more entities having one or more entity types 304. The view definition record 300 can include information indicating a UI format for displaying entities having one or more of the entity types 304. The view definition record 300 can be generated based on information (e.g., at least one criterion) received from a user or at least one predefined criterion. In certain embodiments, the information to generate a view definition record can be received via one or more of the GUIs described with reference to FIGS. 8-10. The view definition record 300 and the UI components identified based on the view definition record 300 can be generated by the client system 102 and/or the repository system 110.

The view definition record 300 can include a view definition 302. The view definition 302 (e.g., a data structure or a flat file) can include general information about a dynamic view that can be generated based on the view definition record 300. The general information can include information displayed in a main UI of the dynamic view. The view definition 302 can include information used to determine how to generate the dynamic view. The view definition 302 can include at least one attribute and/or at least one criterion indicating one or more entities from which information can be displayed in a dynamic view (e.g., the view 190) based on the view definition record 300. The view definition 302 can include information identifying a name 310 and/or a description 312 for the dynamic view generated based on the view definition record 300. A dynamic view can be generated based on the view definition record 300 for entities that are associated with one or more of the entity types 304. In some embodiments, information in different entities having the same entity type may be dynamically displayed in different views, such that information corresponding to certain entities having entity types 304 can be displayed based on the view definition record 300.

The view definition 302 can include target criteria 308, which can provide one or more additional criterion to determine entities based on which information can be displayed using the view definition record 300. For example, entities such as a Web Services (WS) Service and a Representational State Transfer (REST) Service can have the same entity type; however, information in one of these entities can be displayed based on the view definition record 300 for the entity that satisfies the target criteria 308. In some embodiments, the target criteria 308 can include criteria in a query language, such as a Java Persistence Query Language (JPQL). The entity type 304 along with the target criteria can be used to determine which entities can be displayed based on the view definition record 300.

The view definition record 300 can include one or more UI formats (e.g., the UI format 172) which can be used to generate the dynamic view (e.g., the view 190) for information corresponding to an entity that satisfies the criteria of the view definition record 300. In certain embodiments, the view definition 302 can indicate one or more UI locations 314 of UI elements (e.g., a widget, a control, a button, an input field, etc.) to be included in the dynamic view. The UI locations 314 can include one or more locations in a data store (e.g., the format store 170), which can contain UI elements. The UI elements in the data store can include locations of UI artifacts. A UI artifact can include one or more of any of the following: a wrapper task flow, a page definition file, and/or a page fragment. A UI format can be determined based on the UI elements stored at the UI locations 314 and one or more UI components, e.g., regions, displayed in the dynamic view. Each region can display information based on a task flow definition corresponding to a task flow. Information about the task flows can be stored in a data store (e.g., the format store 170). A task flow provides a modular approach for defining control flow in a GUI. The task flow can relate to a set of activities that can be performed in the GUI for entities that are presented based on the view definition record 300.

The view definition record 300 can include one or more region definitions 320. Each region definition 320 can correspond to a task flow. The region definition 320 can indicate criteria for displaying UI elements corresponding to a region of a GUI. The region definition 320 can include attributes corresponding to a UI format of the region. Generating a view dynamically from a UI format can be described further with reference to FIGS. 4 and 5.

The region definition 320 can include information that defines at least one attribute and/or at least one criterion of a region of a UI format determined based on the view definition record 300. A region identifier 322 in the region definition 320 can indicate a region corresponding to the region definition 320. The region definition 320 can include a description 326 of a region. The region definition 320 can include one or more UI attributes of a UI generated for a region in a dynamic view.

The UI attributes of the region definition 320 can include a UI layout type 324 that indicates a type of layout of a region. For example, the UI layout type 324 can indicate a function layout or a generic layout. The region definition 320 can include one or more UI layout identifiers 328 that identify a portion of a UI layout for the region corresponding to the region definition 320. The region definition 320 can indicate one or more UI configuration files 330 that can store additional information about a UI configuration of the region. In some embodiments, the UI configuration files 330 can include one or more extended markup language (XML) configuration files that indicate UI display properties for the region. The UI display properties can indicate style, display properties, control types, list-of-values, other types of display properties, or a combination thereof.

The region definition 320 can include information about one or more relationship configurations 332. The relationship configuration 332 can indicate one or more relationship configurations. A relationship configuration can be a data structure that provides information for displaying, within a region, information corresponding to entities that have the entity type(s) 304 and that satisfy the target criteria 306. For example, the region definition 332 can identify a relationship configuration 340 and a relationship configuration 360. Each of the relationship configurations 340, 360 can be represented as a node (e.g., a location or an area) within a region identified by the region definition (e.g., the region definition 320).

A relationship configuration, e.g., the relationship configuration 340, can provide a configuration for displaying information corresponding to entities for a node of a region in a dynamic view. A relationship configuration can be defined for each node in a region. A node can be defined for each distinct type of data identified as having the entity type 304 and an associated entity type. For example, the associated entity type can include an interface, an endpoint, a deployment, or other type of resource or object that can be associated with the entity type 304 (e.g., composite). The view definition record 300 can include the relationship configuration 340 for a node corresponding to an entity type associated with the entity type 304 and the relationship configuration 360 for another node corresponding to another entity type associated with the entity type 304.

In FIG. 3, the relationship configuration 340 can include an entity type 346 for an entity that has one of the entity types 304 and that satisfies the target criteria 306. The entity type 346 of an entity can be associated with the entity type 304. The relationship configuration 340 can indicate a node name 342 corresponding to a node, which is displayed in a portion of a region. The relationship configuration 340 can include a type path 344 associated with the entity type 346. The type path 344 can indicate a path in a hierarchical data model from a root entity type to the entity type 346. The type path 344 can be used to identify a data structure corresponding to the entity type 346 in the hierarchical data model. The data structure corresponding to the entity type 346 can provide attributes of the entity type 346. The attributes for the entity type 346 can be used to determine what information to display about the entities having the entity type 346 and how to display the information about those entities. The relationship configuration 340 may indicate one or more UI attribute configuration files 348. A UI attribute configuration file may indicate UI attributes for generating a UI corresponding to a node for the relationship configuration 340.

The relationship configuration 340 can include attribute configuration information 350. The attribute configuration information 350 may indicate one or more attribute configuration(s) 370, 380. The attribute configuration(s) 370 can identify one or more attributes configurations 390, 392. Each of the attribute configurations 370, 380 can be associated with a data structure. Each attribute configuration 370, 380 can indicate a configuration for displaying information about attributes related to the entities having an entity type (e.g., the entity type 346) of a relationship configuration (e.g. the relationship configuration 340).

An attribute configuration, e.g., the attribute configuration 370, can include a name (e.g., a name 372) of the attribute configuration. The attribute configuration 370 can include UI display properties 374. The UI display properties 374 can indicate information about displaying information about one or more attributes corresponding to an entity type (e.g., the entity type 346) of the relationship configuration (e.g., the relationship configuration 340). In some embodiments, the UI display properties 374 can indicate a UI configuration file (e.g., a UI configuration XML, file). The UI display properties 374 can indicate properties for displaying UI elements for presenting the attributes corresponding to the entity type. For example, the UI display properties 374 can indicate a style, display properties, control type(s), list-of-values, other types of display properties, or a combination thereof.

The UI display properties 374 can identify one or more UI components, such as a UI component 376. The UI component 376 can include a UI layout 382 and/or one or more UI page components 384. The UI layout 382 and/or the UI page components 384 can be used to generate a portion of a UI corresponding to a node identified by a relationship configuration 340. Each of the attribute configurations 370, 380 can be associated with one or more other attribute configurations 390 and 392. Each of the attribute configurations 390 and 392 can identify configurations for displaying information in each attribute (e.g., extended attributes) related to an attribute for an attribute configuration (e.g., the attribute configuration 370). The attributes displayed for the attribute configurations 390 and 392 can be attributes that are extended from the entity type 346.

By determining a format for displaying information based on stored task flows corresponding to an entity type, the repository system can dynamically determine UI elements to display a feature and/or a function available an entity associated with the entity type. The stored task flows can indicate the type of activities and/or features for accessing the entity type. By indicating UI elements and/or attributes in a view definition record with respect to displaying information about an object corresponding to an entity having a certain entity type, a display presented based on the entity type can be customized without a need to modify individual profiles to specify display attributes for those entity types. The UI format identified based on the view definition record can enable a repository system to selectively determine the features to display information in entities to certain types of roles. Identification of the properties and UI elements for each region enable an administrator to modify a source of UI components and/elements, rather than having to modify a specific display profile. Further, a view definition record can enable the repository system to determine a layout that is most effective for certain roles when viewing entities having one or more of the entity types indicated by the view definition record.

Figure 4:
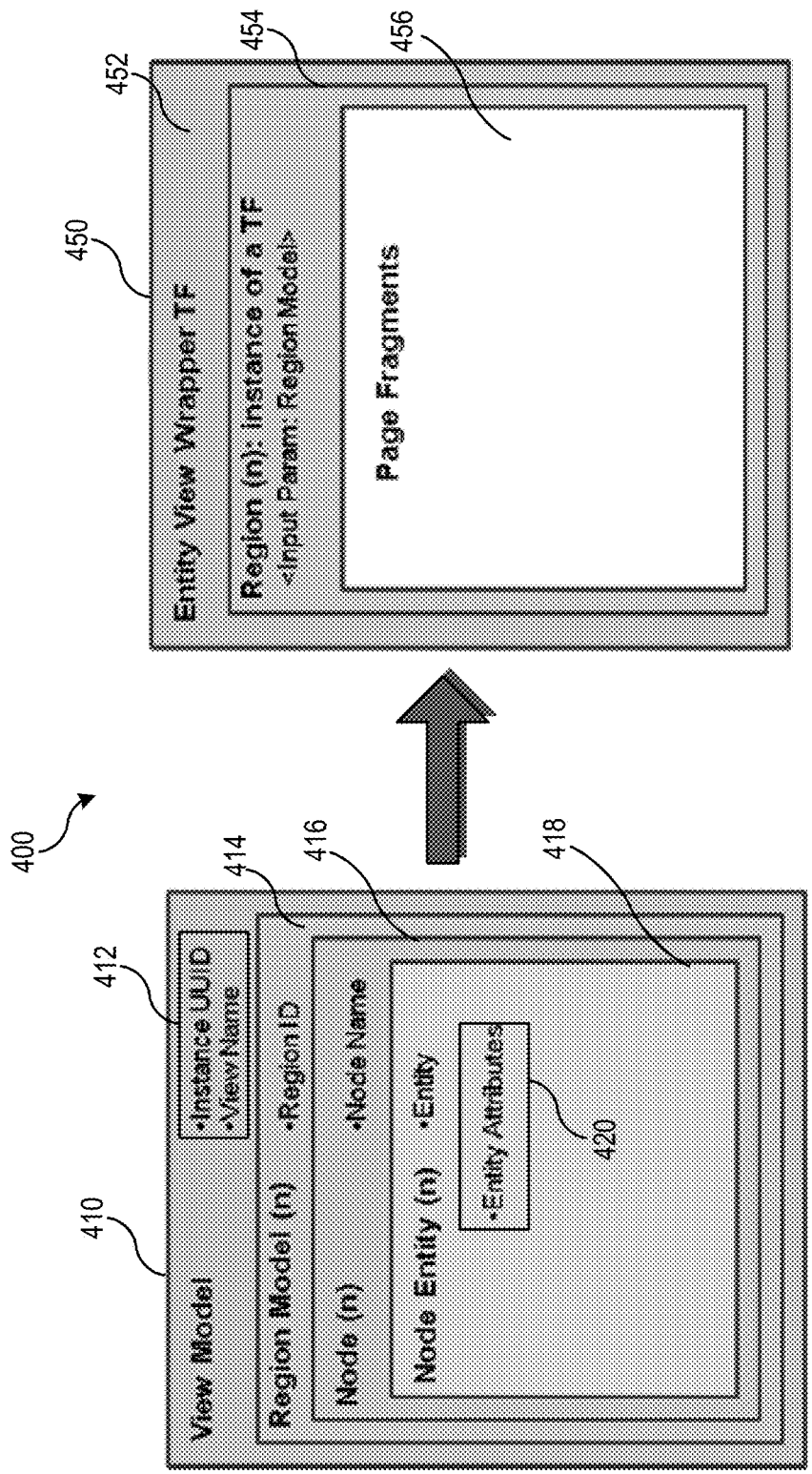
FIG. 4 shows a mapping of a view definition record dynamically to a user interface layout of a view according to an embodiment of the present invention.

FIG. 4 shows a mapping 400 of a view definition record (e.g., the view definition record 300) dynamically to UI format 450 of a view according to an embodiment of the present invention. A view model 410 can be used to determine the mapping 400, which can be used to produce the UI format 450. The dynamic UI format 450 can be generated based on a layout or organization of elements determined from the view model 410. The UI format 450 can be used to determine the task flows that can be implemented for the UI format to generate the dynamic view. An example of the UI format 450 generated based on the mapping 400 is discussed with reference to FIG. 5. The mapping 400 described with reference to FIG. 4 can be performed by the repository system 110 of FIG. 1 or the client system 102.

In certain embodiments, the view model 410 can be used to determine the UI format 450 for displaying information in one or more entities in a dynamic view (e.g., the view 190). The layout of the view model 410 can be generated based on the view definition record (e.g., the view definition record 300) for the one or more entities requested to be displayed for the dynamic view. The view model 410 can be determined based on a predetermined format that is modified based on the view definition record. In some embodiments, the view model 410 can be generated dynamically based on the view definition record.

The view model 410 can be associated with an identifier (e.g., UUID) corresponding to information each of the entities that can be displayed based on UI format 450 determined from the view model 450. The view model 410 can be associated with a view name. The view name can correspond to a name associated with the view definition record. The view model 410 can indicate attributes 412 for the UI format 450. For example, the attributes 412 (e.g., a view name or a UUID) associated with a main view in the view model 410 can be used to determine a entity view task flow 452 to be displayed in the UI format 450. The task flow 452 of the UI format 450 can display general information from an entity in a dynamic view. For example, the general information can include information in the view definition 302 of the view definition record 300.

Using the view definition record 300, the task flow 452 can be identified and selected from a UI store (e.g., the format store 170) associated with the repository system. The task flow 452 can indicate a method and/or layout for displayed information in entities that have the entity type (e.g., the entity type 346) and that satisfy the target criteria 308 for a view definition record corresponding to the view model 410. The view definition 302 can be used to populate the task flow 452 of the UI format 450. The dynamic view can be generated based on the UI format 450 and the information indicated in the view definition record.

The view model 410 can include one or more region models 414. Each region model 414 can correspond to a region ID. The region ID can be used to identify each region in the UI format 450. Each region model 414 can correspond to a region definition (e.g., the region definition 320) of a view definition record. The UI format 450 can include one or more regions 454. Each region 454 can be an area in the UI format 450. The region 454 can be generated for the dynamic view based on the corresponding region definition indicated by the region model 414.

The view model 410 can include one or more nodes 416. Each node 416 can correspond to a different node indicated by the view definition record. For example, each node 416 can correspond to a node identified in a relationship configuration (e.g., the relationship configuration 340 or the relationship configuration 360). Each node 416 can map to a page fragment 456 within a region 454. Each node 416 can include a node entity 418. Each node entity 418 can correspond to a different entity in the node 416. Each node entity 418 can include one or more entity attributes 420. The entity attributes 420 can be used to present information for the node 418. The entity attributes 420 can correspond to attributes indicated by an attribute configuration 370, 380, 390, 392 in the view definition record 300.

Each region 454 can contain one or more page fragments 456. Each page fragment 456 can correspond to a task flow of activities corresponding to the node 416. The task flow corresponding to the page fragment can be part of a single larger task flow that for the region 454. In some embodiments, the page fragment 456 can be a document that can be rendered as content in a page. For example, the page fragment 456 can be a Java server page (JSP) document that can be rendered as content in another JSP, e.g., a JSP of the region 454.

The page fragment can be retrieved from a data store, e.g., the format store 170. The page fragment 456 can be identified based on the attributes of the node 416 in the view model 410. The page fragments 456 can contains one or more components to include in the UI format 450 for the node. A component can indicate a format for presentation of the node 416 in the region 454. In some embodiments, the page fragment 456 can be identified based on one or more of the entity attributes 420 of the node 418.

The resulting UI format 450 determined based on the view model 410 can be used to dynamically generate a view (e.g., the view 190) to display to a user in response to a request to view information about entities. The task flows 452, 454, and the page fragments 456 can all be used to generate the view. Described below with reference to FIG. 5 is an example of a dynamic view that can be generated based on the UI format 450 determined from the mapping 400.

Figure 5:
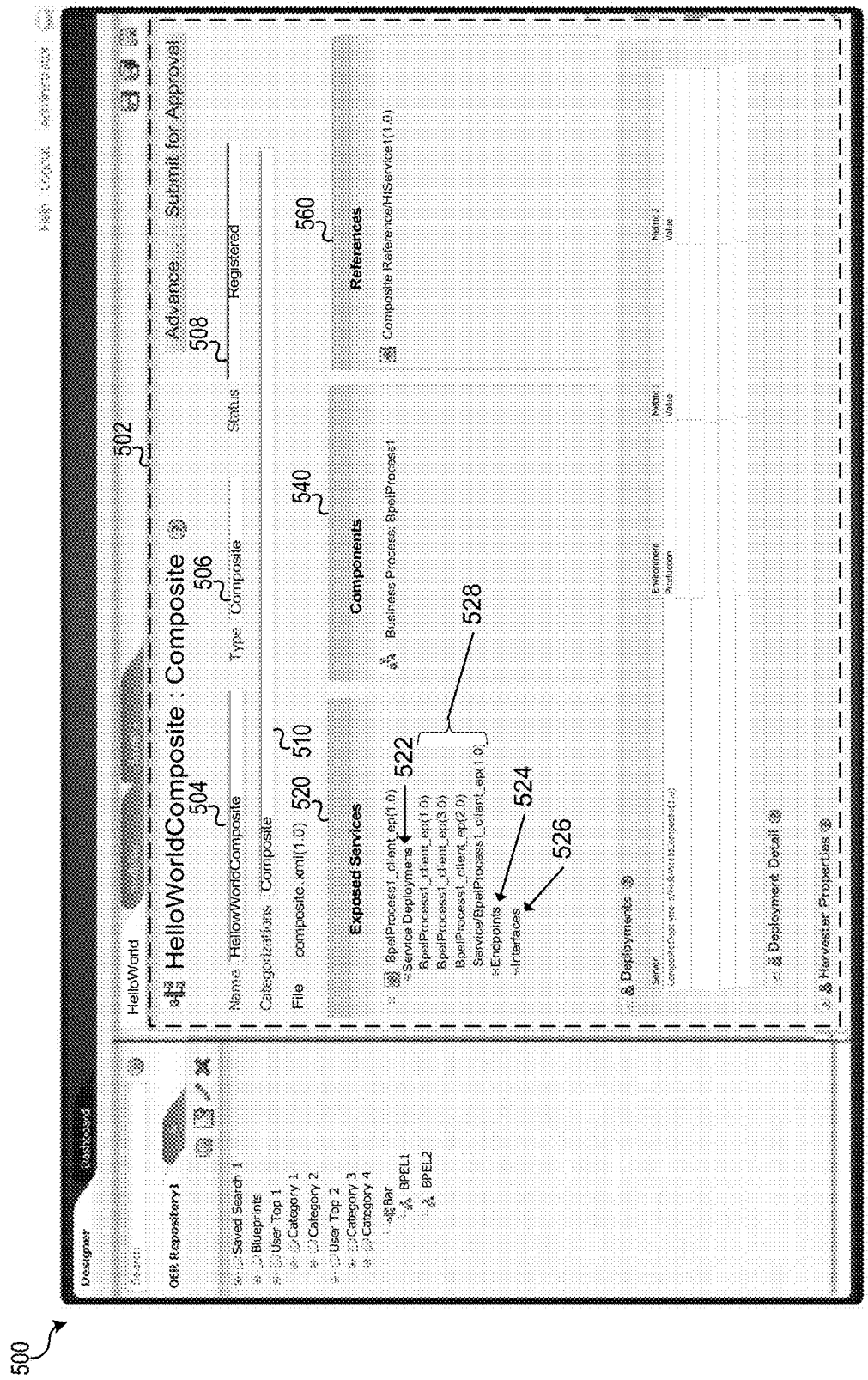
FIG. 5 shows a view of entities dynamically generated based on a view definition record according to an embodiment of the present invention.

In FIG. 5, a dynamic view 500 of entities generated based on a view definition record (e.g., the view definition record 300) is shown according to an embodiment of the present invention. In certain embodiments, the view 500 can be generated based on a UI format (e.g., the UI format 450) determined based on a view definition record. The view 500 can be generated by the repository system 110 or the client system 102 of FIG. 1. The view 500 can be displayed in response to a request to access (e.g., create, read, update, or delete) one or more objects which correspond to one or more entities that are associated with one or more entity types. In the example shown in FIG. 5, the view 500 presents a dynamic view of an object having a composite type. The view 500 can be displayed based on criteria provided by a user to access entities associated with the composite type. The view 500 can display information in an entity such as a "BPEL process1" that has one or more of the types of objects chosen for the view 500, such as the composite type.

To generate the view 500, a view definition record (e.g., the view definition record 300) can be identified corresponding to the entity types requested by a user having a role for accessing the repository system. Upon identifying a view definition record, a UI format (e.g., the UI format 450) may be determined and used to generate the view 500. The UI format can be determined based on a mapping, such as the mapping 400 described with reference to FIG. 4.

The view 500 can present an entity view 502 that provides information about the entity types to be displayed in the view 502. The entity view 502 can be generated based on the entity view wrapper task flow (e.g., the entity view wrapper task flow 452) of a UI format (e.g., the UI format 450) mapped based on a view definition record associated with the entity types. The entity view 502 can include a name 504, an entity type 506, a status 508, and a categorization 510. Each of the attributes can be obtained from the view definition record 300 and/or from a view model, e.g., the view model 410, determined based on the view definition record 300. The name 504 of the entity view can corresponds to a view name associated with a view model (e.g., the view model 410). The entity type 506 can indicate one or more entity types (e.g., a "composite" entity type) that are presented in the entity view 502. The status 508 can indicate a status of a user's access. The categorization 510 can indicate a categorization of the entity types shown in the view 500.

The view 500 can include one or more regions such as 520, 540, 560. Each of the regions 520, 540, 560 can correspond to a region (e.g., the region 454) in a UI format 450. As explained above, the region in a UI format can be mapped based on a region definition (e.g., the region definition 320) indicated in a view definition record associated with the entities having the entity type (e.g., the entity type 506) presented in the view 500.

Each of the regions 520, 540, 560 can display information about entities having an entity type corresponding to one or more nodes included in a region. For example, the region 520 can include one or more nodes 522, 524, 526, each of which can have information about entities corresponding to an entity type of the corresponding node. In the region 520, a node 522 can have entities associated with a first entity type (e.g., a service deployment), a node 524 for entities associated with a second entity type (e.g., an endpoint), and a node 526 having entities associated with a third entity type (e.g., an interface). The information from the entities displayed in the nodes can include one or more UI element for the entities. For example, the node 522 can display UI elements associated with one or more entities 528. The UI elements associated with the entities 528 can display information about attributes of those entities 528.

Figure 6:
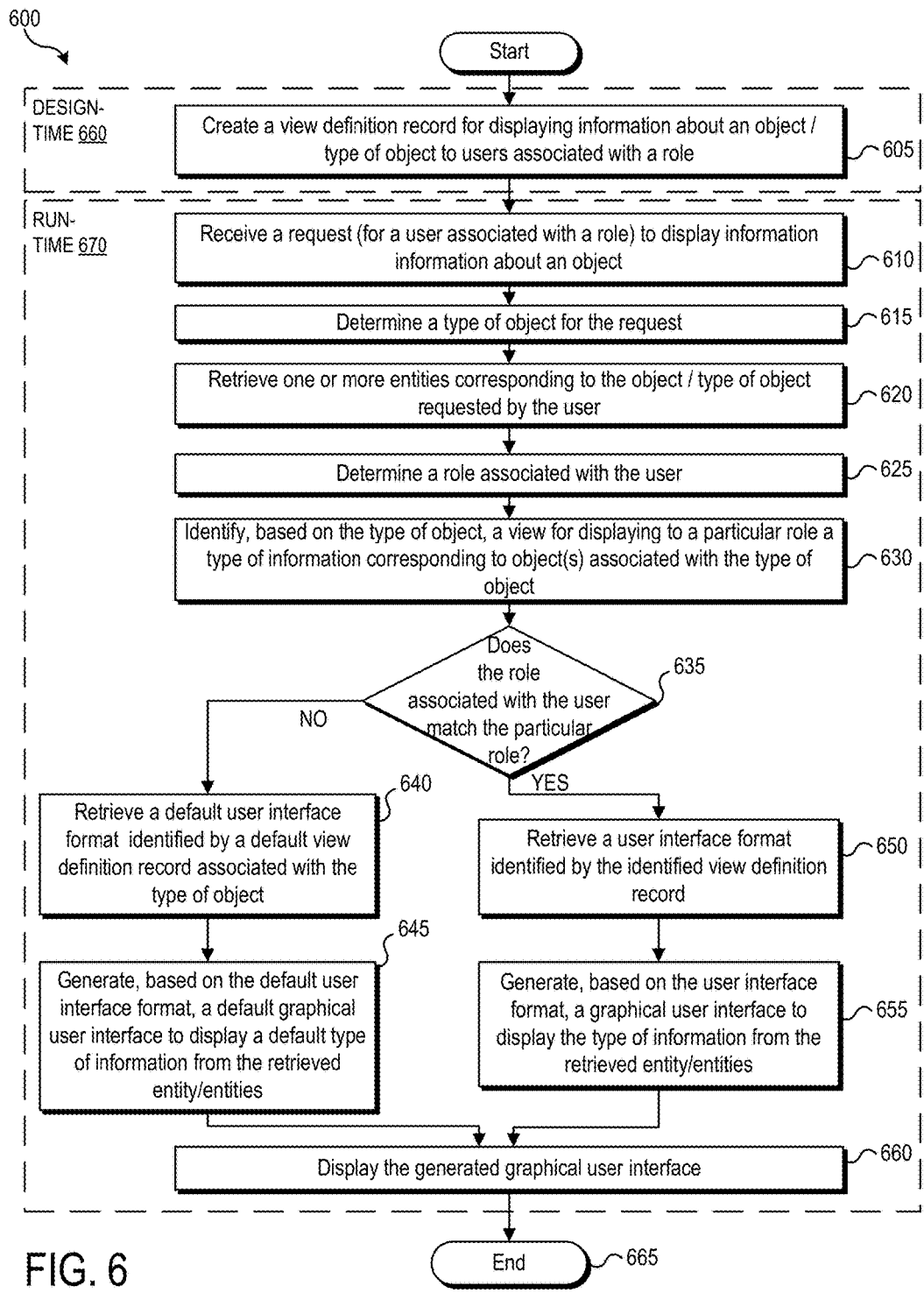
FIG. 6 shows a flowchart illustrating a process for dynamically displaying information in a repository system based on a role of a user according to an embodiment of the present invention.

FIG. 6 shows a flowchart illustrating a process for dynamically displaying information in a repository system based on a role of a user according to an embodiment of the present invention. At a high level, process 600 includes a design-time portion 660 including processing performed at design time and a run-time portion 670 (or request time portion) including processing performed during runtime. Design-time 660 processing includes creating views and associating the views with roles. Design-time 660 may also include (not shown in FIG. 6) assigning roles to users. Run-time 670 includes processing that is triggered upon a request by a user for information in the repository system and that determines a response to the request, such as presenting a view of the information based on the role of the user. Run-time 670 processing may include processing to dynamically display a view of information about an object associated with a type of object when requested by a user associated with a role associated with the view.

Beginning at block 605, a view definition record is created to define a view for displaying information about a type of object or an object in the repository system to one or more roles. The view definition record may include at least one criterion indicating the type of information about a type of object or an object that can be displayed. A criterion may be specified in the view definition record by identifying one or more entities and/or one or more entity types in the repository system that can be viewed by a user and more specifically, the information that can be viewed from the entity or the entities satisfying the criterion. The criterion can specified with respect to one or more roles for accessing the repository system. A view definition record may be used to identify a UI format for displaying information about an object or a type of object to user with a particular role. In some embodiments, a UI format may be specified with respect to an entity type corresponding to a type of object. The view definition record can be generated as described above with references to FIGS. 2 and 3.

In one example, the process 600 can create the view definition record 300 of FIG. 3 to include one or more criteria defining the type of object(s) corresponding to an entity type (e.g., the entity type 304) that can be viewed in a repository system. The view definition record 300 can include a UI format, such as the format defined based on one or more region definitions, e.g., the region definition 320. The view definition 300 record can indicate one or more roles, such as target roles 306, which are permitted to view information included in entities that satisfy the criteria of the view definition record 300.

At block 610, a request is received to display a view of information about an object (e.g., Composite Service A). In some embodiments, the request may include a type of object (e.g., a composite service) to indicate one or more objects in a repository system. The request can be made by a user associated with a role. The role may correspond to a role for operating or using the repository system. For example, a role may be a developer role in which the user is requesting to view attributes about a composite service stored in the repository system.

At block 615, a type of object may be determined for the request. The type of object may be indicated by the request. In some embodiments, the type of object of an object may be determined by locating an entity corresponding to the object in the repository system. The type of object may be determined based on an entity type of an entity corresponding to the object.

At block 620, one or more entities are retrieved from the repository system. An entity may be retrieved for an object or the type of object of an object requested by a user.

At block 625, a role associated with the user may be determined. For example, a role may be determined based on information (e.g., login information) identifying a user submitting the request. In some embodiments, a user may be identified based on information identifying a client system used to submit a request. The information identifying the client system may be used to identify the user and determine the role associated with the user. The repository system may store information identifying a user in association with one or more roles for the user.

At block 630, the process 600 can include identifying, based on the type of object, a view for displaying information about one or more objects associated with the type of object. For example, one or more view definition records can be identified based on the type of object. A view definition record may be identified based on an entity type corresponding to the type of object (e.g., a composite service). A view may be defined based on a view definition record. A view definition record may indicate a type of information to display (e.g., an attribute of an entity) from an entity corresponding to entity type. A view definition record may identify a format (e.g., a user interface format) for displaying the type of information corresponding to an entity. The format may be identified at a data source, which stores information about the format. In some embodiments, a view definition record may include one or more criteria for displaying information about objects associated with the type of object. For example, a criterion may indicate one or more attributes of an object that can be displayed. The criteria can be associated with a role for viewing information in the repository system.

At block 635, process 600 may include determining whether a determined role associated with a user matches the particular role for which a view is identified. In some embodiments, the determined role associated with the user may be compared to the particular role indicated by a view definition record identified at block 630. Upon determining that the determined role matches the particular role, process 600 may proceed to blocks 650 and 655 to generate the identified view of information about one or more objects requested by a user. Upon determining that the determined role does not match the particular role, process 600 may proceed to blocks 640 and 645 to generate a default view of information about one or more objects requested by a user.

At block 640 to retrieve a default UI format identified by a default view definition record. A default view definition record may include information to generate a default view for displaying a default type of information about one or more objects associated with a type of object. A default view definition record may be identified based on the type of object. A default view definition record may be identified based on an entity type corresponding to the type of object (e.g., a composite service).

A default view may be defined based on a default view definition record. A default view definition record may indicate a default type of information to display (e.g., an attribute of an entity) from an entity corresponding to entity type. A default view definition record may identify a default format (e.g., a user interface format) for displaying the type of information corresponding to an entity. The default format may be located a data source, which stores information about the format. In some embodiments, a default view definition record may include one or more criteria for displaying information about objects associated with the type of object. For example, a criterion may indicate one or more attributes of an object that can be displayed. The criteria can be associated with a default role for viewing information in the repository system.

At block 645, the process 600 can generate a default GUI based on the default UI format identified by the default view. The default UI format may indicate a manner in which to display the default type of information from the retrieved entity/entities. The GUI based on the default UI format.

Returning to block 635, when the determined role associated with the user matches the particular role for an identified view, at block 650, a UI format can be retrieved for the identified view. For example, the process 600 can retrieve a UI format (e.g., the UI format 450) identified by a view definition record as explained above with reference to FIGS. 3-5.

At block 655, the process 600 can generate a GUI, e.g., the GUI 500, to display the type of information from the retrieved entity. The GUI can be generated based on the UI format retrieved at block 650.

Then at block 660, the default GUI generated at block 645 or the GUI generated at block 655 may be displayed. The process 600 can proceed to end at block 665.

In certain embodiments, the process 600 can be implemented by certain embodiments of the repository system 110. The repository system 110 can implement the process 600 to determine a UI format to display a type of information in an entity corresponding to an object or a type of object requested by a user associated with a role. In certain embodiments, block 605 can be performed during design-time portion 660 that is different from run-time portion 670 when blocks 610-660 can be performed. Design-time 660 and run-time 670 may occur in any order. In some embodiments, run-time 670 may occur subsequent to (e.g., immediately after) design-time 660. For example, block 605 can be performed during the design-time 660 when one or more view definition records can be created.

Process 600 can be performed in an iterative manner for design-time 660, the run-time 670, or both. For example, block 605 can be iteratively performed during design-time 660 for each view definition record based on criteria associated with one of a plurality of roles. In another example, blocks 610-660 can be iteratively during run-time 670 for each request (e.g., the request 108) received from a user of the repository system. It will be appreciated that process 600 is illustrative and that variations and modifications are possible. Action or operations described for process 600 as sequential may be executed in parallel and/or order of operations may be varied, and operations may be modified, combined, added or omitted.

Figure 7:
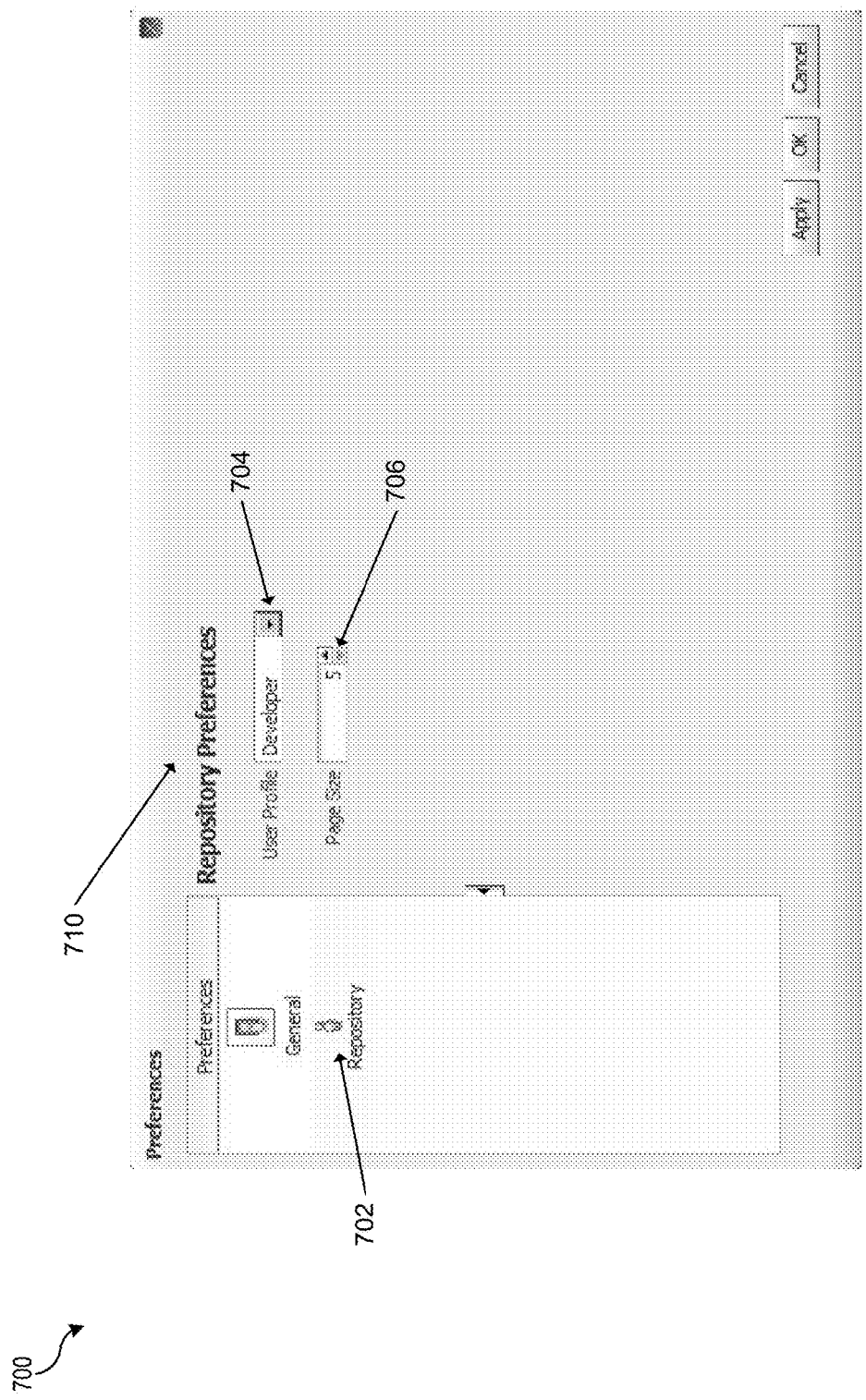
FIG. 7 shows a graphical user interface to receive user criteria to display a view according to an embodiment of the present invention.

FIG. 7 shows a GUI 700 (e.g., a view profile interface) to receive user criteria to display a view according to an embodiment of the present invention. Specifically, the user criteria can indicate a user's selection of a role for operating the repository system according to an embodiment of the present invention. The role specified via the GUI 700 can be used to dynamically generate a view of entities having one or more entity types according to an embodiment of the present invention. The GUI 700 can be included or implemented in the GUI 106 of FIG. 1. The GUI 700 can be presented to a user operating a client system (e.g., the client system 102) to access a repository system (e.g., the repository system 110).

The GUI 700 can include one or more interactive elements, which can receive input indicating one or more preferences to operate the repository system. For example, the GUI 700 can include a repository preferences element 702 to cause the GUI 700 to display one or more interactive elements 704, 706 that enable the user to specify preferences for operating the repository system. The GUI 700 can include a page size element 706, which can receive input indicating preferences for a display page size to display information accessed from the repository system. The GUI can include a profile element 704, which can receive input indicating selection of a view profile, or a role, for operating the repository system. Input received from selection of the profile element 704 can be provided in the request 108 to the repository system 110. The repository system can use the role to determine how to display information in an entity in response to a request, as explained above.

Figure 8:
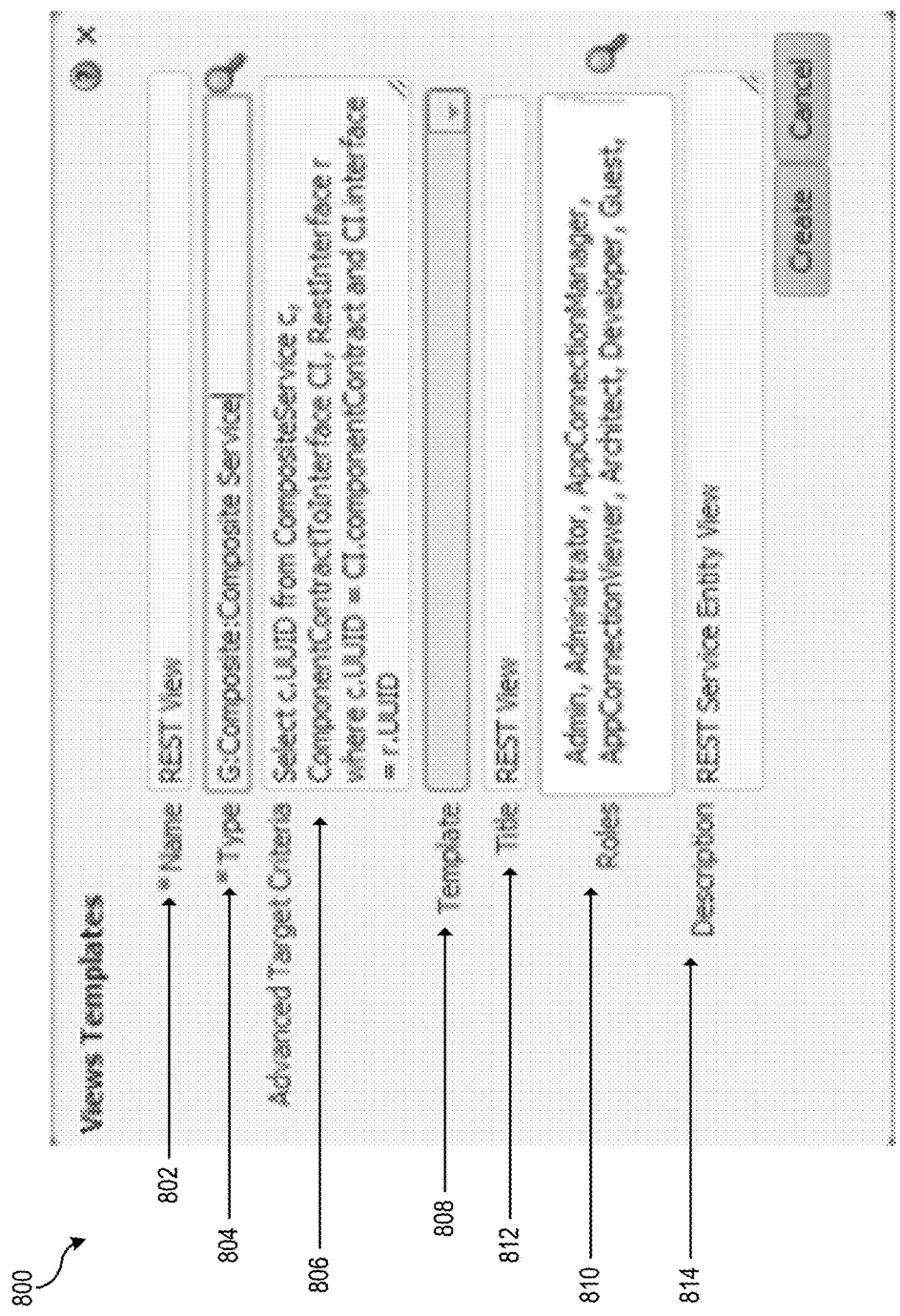
FIG. 8 shows a graphical user interface to receive criteria for a view definition record according to an embodiment of the present invention.

FIG. 8 shows a GUI 800 to receive criteria for a view definition record according to an embodiment of the present invention. Specifically, the GUI 800 can receive input including criteria for a view definition record, e.g., the view definition record 300. The input received via the GUI 800 can be used to generate a view definition record. The GUI 800 can be included or implemented in the GUI 106. The GUI 800 can enable a user (e.g., an administrator) who is permitted to access the repository system to create a view definition record.

The GUI 800 can include one or more interactive elements to receive input indicating criteria for a view definition record. An interactive element 802 may receive input indicting a name to be associated with a view definition record. An interactive element 814 may receive input indicating a description of the view definition record. An interactive element 812 may receive input indicating a title for the view definition record. The GUI 800 can include an interactive element 810 to receive input indicating one or more roles to be associated with a view definition record created for the criteria indicated by the GUI 800. Interaction with the interactive element 410 may cause a different GUI (e.g., the GUI described with reference to FIG. 9) to be displayed that enables a user to choose one or more roles from a list of roles identified for the repository system.

The GUI 800 can include one or more interactive elements to indicate criteria for determining one or more types of entities that can be viewed in a GUI for a user having a role indicated by the interactive element 810. In some embodiments, the GUI 800 can include an interactive element 804 to receive input that indicates one or more entity types. The entity types can be used to determine the entities that can be presented to a user. In some embodiments, the GUI 800 can include an interactive element 806 to receive input that indicates target criteria for presenting entities to a user. The target criteria can be in a query language which can be used to determine entities that can be viewed by a user. As explained above, the criteria received via the GUI 800 can be used for criteria to generate a view definition record.

In certain embodiments, the GUI 800 can include an interactive element 808. The interactive element 808 can receive input which indicates one or more view definition templates. A view definition template can provide criteria to create a view definition record for one or more roles for accessing a repository system. In certain embodiments, interacting with the interactive element 808 can cause one or more additional GUIs to be displayed, e.g., the GUI of FIG. 10. The additional GUI(s) can enable a user to indicate one or more view definition templates stored by a repository system.

Figure 9:
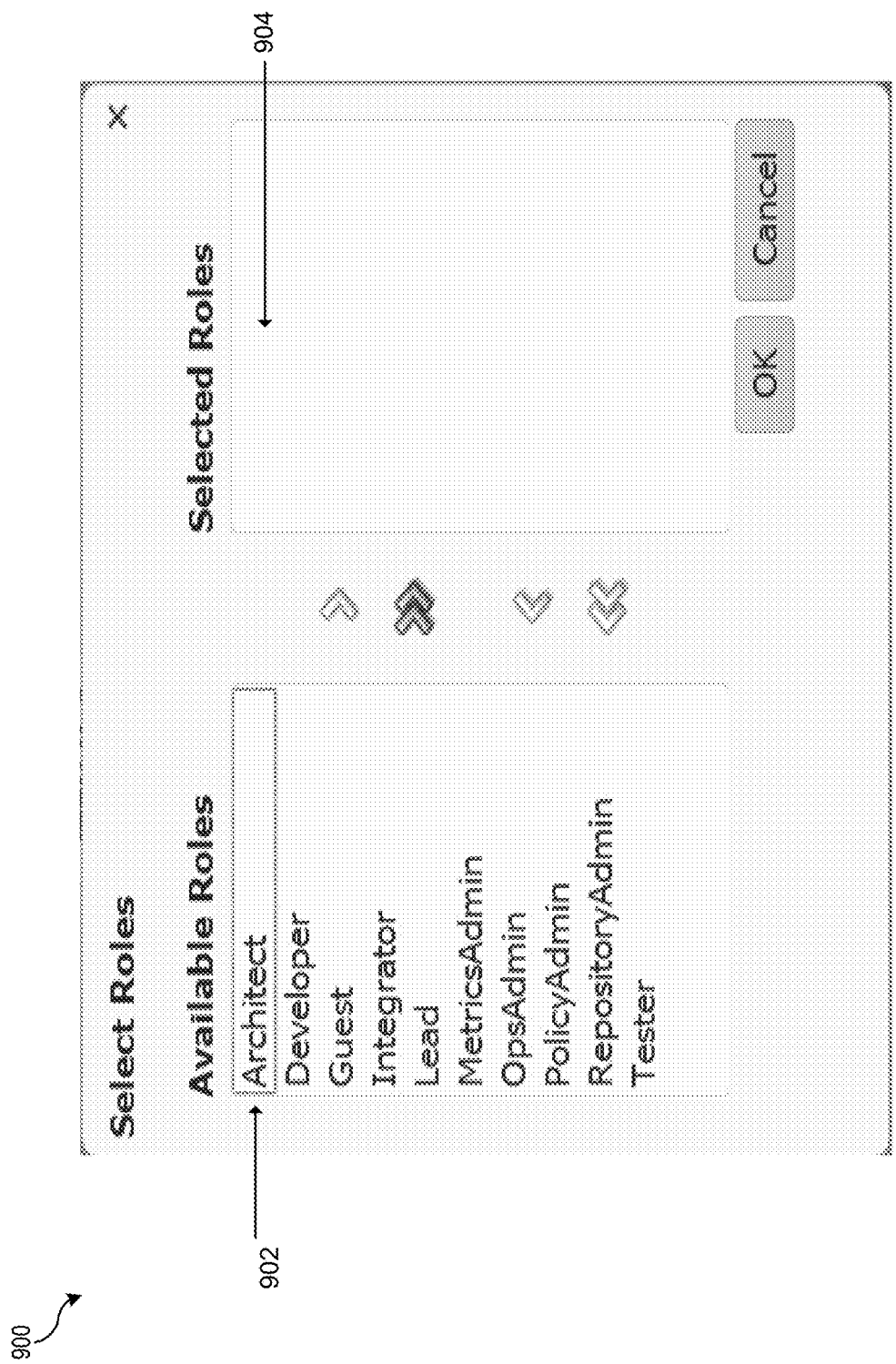
FIG. 9 shows a graphical user interface to receive criteria for a view definition record according to an embodiment of the present invention.

FIG. 9 shows a GUI 900 to receive criteria for a view definition record according to an embodiment of the present invention. Specifically, the GUI 900 can receive input including one or more roles to be specified for a view definition record. The input received via the GUI 900 can indicate one or more roles for a view definition record. The GUI 900 can be included or implemented in the GUI 106.

The GUI 900 can include one or more interactive elements, such as interactive elements 902 and 904. The interactive element 902 can enable a user to choose from a list of one or more roles for accessing a repository system. Interaction with the interactive element 902 can cause one or more roles to be chosen for a view definition record. The selected roles can be displayed in the GUI 900 via the interactive element 904. One or more roles that are selected can be removed from selection for the view definition record. Roles that are removed may be removed from display with the interactive element 904.

Figure 10:
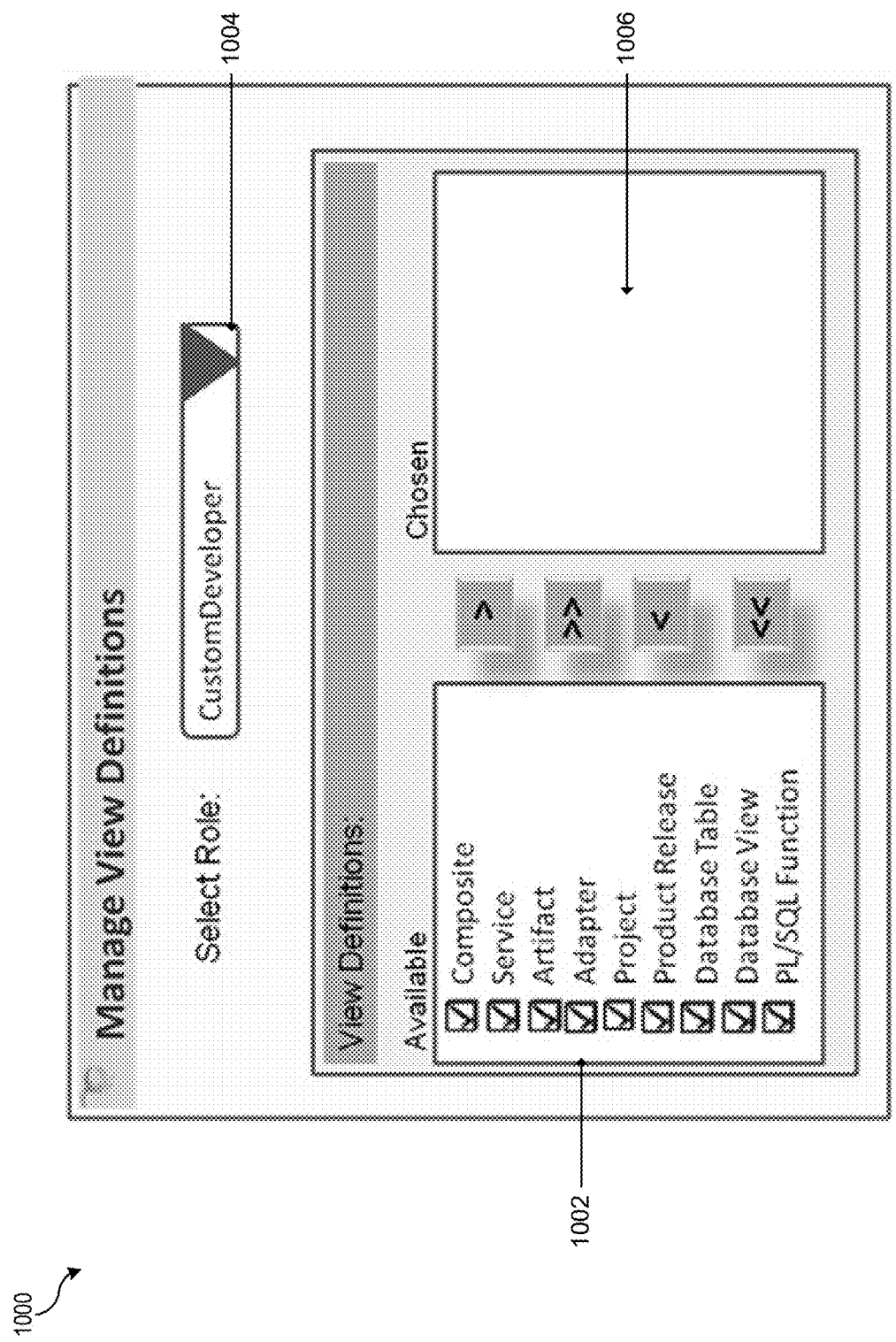
FIG. 10 shows a graphical user interface to manage view definitions associated with a role according to an embodiment of the present invention.

FIG. 10 shows a GUI 1000 to manage view definitions associated with a role according to an embodiment of the present invention. In certain embodiments, the GUI 1000 can include one or more interactive elements to manage view definitions according to one or more roles for viewing information in a repository system. For example, the GUI 1000 can include an interactive element 1004 that enables a user to choose a role for accessing a repository system. The GUI 1000 can enable a user to manage view definition records associated with the chosen role. For example, view definition records may be chosen for having the chosen role.

The GUI 1000 enables a user to choose view definition records to manage (e.g., update or delete) for the chosen role. In certain embodiments, the GUI 1000 can display one or more interactive elements 1002, 1006 to choose the view definitions associated with the role.

In certain embodiments, the interactive element 1002 can display information about a name of one or more view definitions that include the chosen role. Each of the view definitions may correspond to a view definition record stored by a repository system.

The interactive element 1006 may display information about one or more view definition records chosen to for management. The interactive element 1002 may be configured to enable a user to choose view definition records to be displayed by the interactive element 1006. The GUI 1000 may include other interactive elements to choose view definition records to be displayed by the interactive element 1006. In some embodiments, the interactive element 1006 may be configured to enable a user to remove one or more view definition records identified by the interactive element 1006. The GUI 1000 may include other interactive elements to remove one or more view definition records identified by the interactive element 1006.

Figure 11:
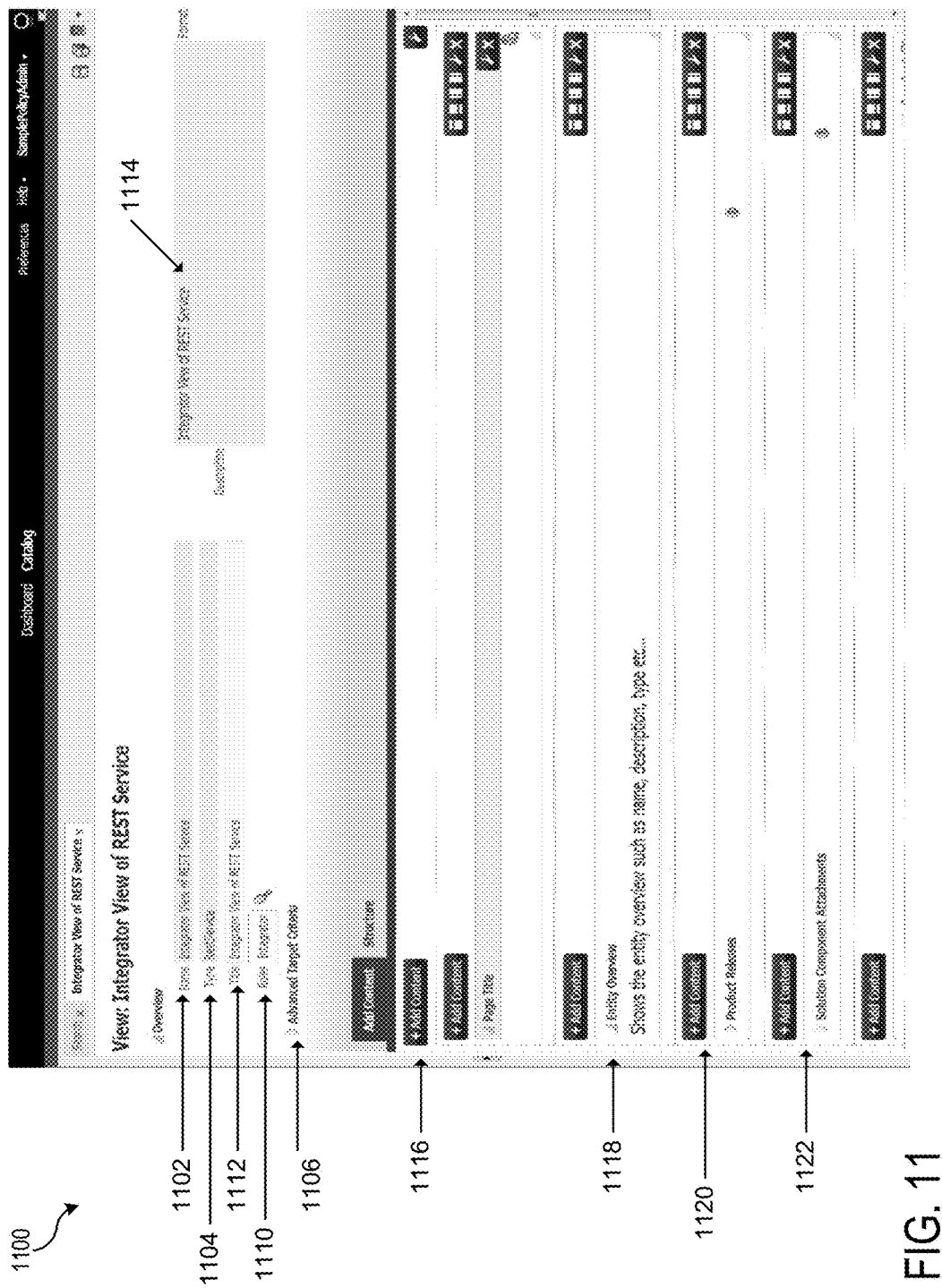
FIG. 11 shows a graphical user interface to edit view definitions according to an embodiment of the present invention.

FIG. 11 shows a GUI 1100 to manage view definitions associated with a role according to an embodiment of the present invention. In certain embodiments, the GUI 1100 can include one or more interactive elements to edit a view definition record. In certain embodiments, one or more of the interactive elements displayed in the GUI 1100 may enable a user to choose or indicate one or more criteria for attributes of a view definition record. The GUI 1100 may be updated to display a view definition record that corresponds to the attributes having the criteria.

The GUI 1100 may include an interactive element 1102 corresponding to a name of a view definition record. The interactive element 1102 may indicate a name of a view definition record, the details of which are displayed in the GUI 1100. In some embodiments, the interactive element 1102 may enable a user to indicate or choose a view definition name of a view definition record to edit. Subsequently, the GUI 1100 may be refreshed to display a view definition record and its attributes or criteria.

The GUI 1100 may include an interactive element 1104 that enables a user to choose and/or edit an entity type of a view definition record. The GUI 1100 may include an interactive element 1112 that enables a user to choose and/or edit a title of a view definition record.

The GUI 1100 may include an interactive element 1110 that enables a user to choose and/or edit a role for a view definition record. The GUI 1100 may include an interactive element 1114 that enables a user to choose and/or edit a description for a view definition record. The GUI 1100 may include an interactive element 1106 that enables a user to choose and/or edit target criteria for a view definition record.

In certain embodiments, the GUI 1100 may include additional content, such as descriptive information for a view definition. For example, the GUI 1100 may include an interactive element 1116 to enable a user to add content to a view definition record. In another example, the GUI 1100 may include an interactive element 1118 to choose and/or edit an entity overview of a view definition record. Other interactive elements may enable a user to choose and/or edit product release(s) and solution component attachment(s) related to components identified for a view definition record.

Figure 12:
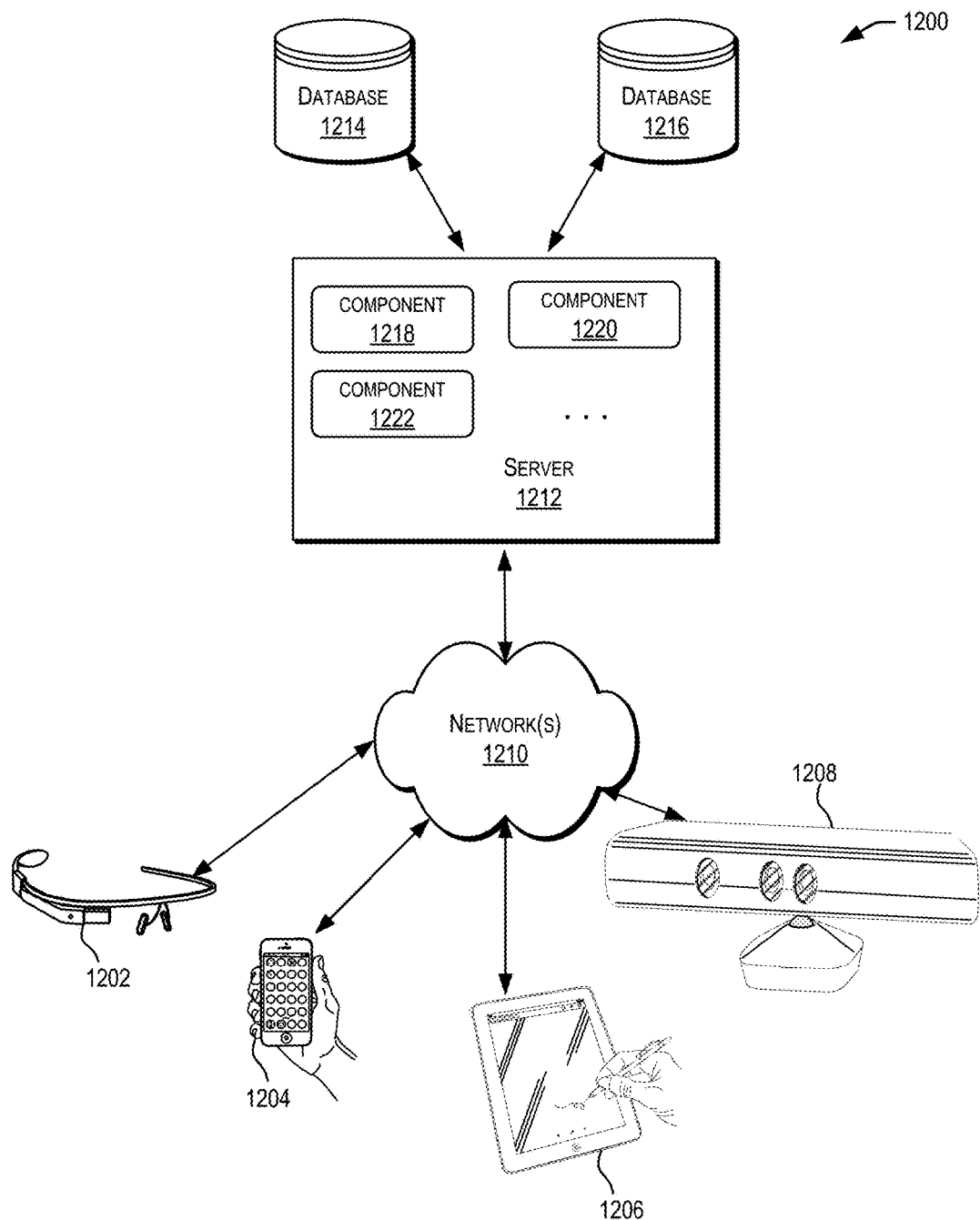
FIG. 12 depicts a simplified diagram of a distributed system for implementing one of the embodiments.

FIG. 12 depicts a simplified diagram of a distributed system 1200 for implementing one of the embodiments. The distributed system 1200 can implement the computing environment 100 of FIG. 1, the computing environment 200 of FIG. 2, or a combination thereof. The distributed system 1200 can implement the process 600 of FIG. 6. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. In certain embodiments, the one or more client computing devices 1202 1208 can include the client system 102 of FIG. 1. Server 1212 may be communicatively coupled with remote client computing devices 1202, 1204, 1206, and 1208 via network 1210. The server 1212 can include the repository system 110 of FIGS. 1 and 2.

In various embodiments, server 1212 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands. The view definitions store 160, the format store 170, and/or the repository store 180 of FIG. 1 can be included in the one or more databases 1214 and 1216.

Figure 13:
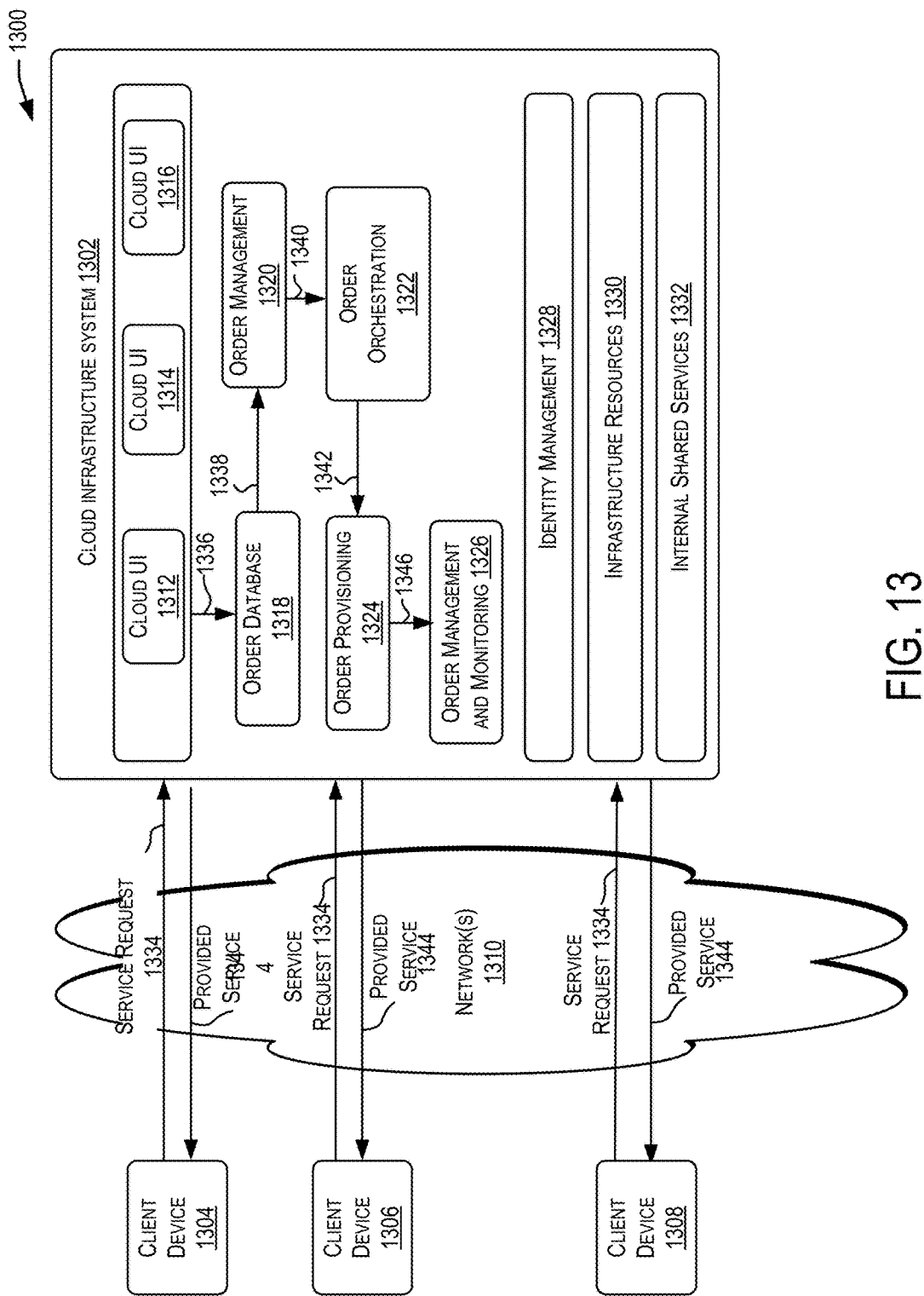
FIG. 13 is a simplified block diagram of components of a system environment by which services provided by the components of an embodiment system may be offered as cloud services, in accordance with an embodiment of the present disclosure.

FIG. 13 is a simplified block diagram of one or more components of a system environment 1300 by which services provided by one or more components of an embodiment system may be offered as cloud services, in accordance with an embodiment of the present disclosure. The system environment 1300 can include or implement the computing environment 100 of FIG. 1, the computing environment 200 of FIG. 2, or a combination thereof. The system environment 1300 can implement the process 600 of FIG. 6. In the illustrated embodiment, system environment 1300 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. For example, the cloud infrastructure system 1202 can include or implement the repository system 110 of FIGS. 1 and 2. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1202, 1204, 1206, and 1208.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1210.

Cloud infrastructure system 1202 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community.

The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud UI, cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 14:
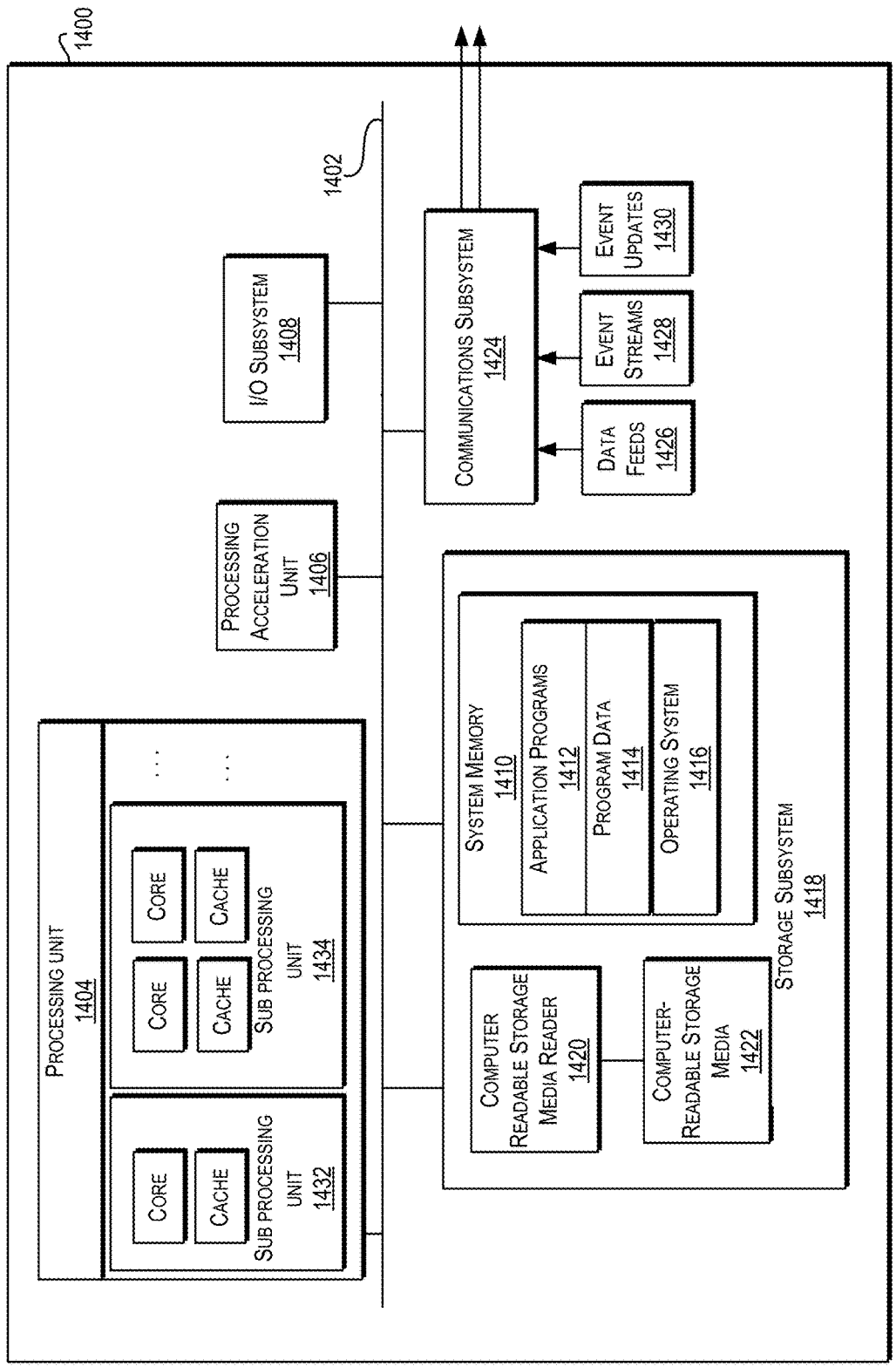
FIG. 14 illustrates an exemplary computer system, in which various embodiments of the present invention may be implemented.

FIG. 14 illustrates an exemplary computer system 1400, in which various embodiments of the present invention may be implemented. The system 1400 may be used to implement any of the computer systems described above. For example, all or some of the elements of the computing environment 100 of FIG. 1, the computing environment 200 of FIG. 2, or a combination thereof, can be included or implemented in the system 1400. The system 1400 can implement the process 600 of FIG. 6. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include UI input devices and UI output devices. UI input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. UI input devices may include, for example, motion sensing and/or gesture recognition devices such as the Microsoft Kinect® motion sensor that enables users to control and interact with an input device, such as the Microsoft Xbox® 360 game controller, through a natural UI using gestures and spoken commands. UI input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, UI input devices may include voice recognition sensing devices that enable users to interact with voice recognition systems (e.g., Siri® navigator), through voice commands.

UI input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, UI input devices may include, for example, medical imaging input devices such as computed tomography, magnetic resonance imaging, position emission tomography, medical ultrasonography devices. UI input devices may also include, for example, audio input devices such as MIDI keyboards, digital musical instruments and the like.

UI output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, UI output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    determining, by a computer system, a type of object associated with an object to be displayed for a user;
    determining, by the computer system, based on the type of object, a view definition record, wherein the view definition record indicates a type of information to display from data stored for the object, wherein the type of information is based on the type of object, and wherein the view definition record identifies a user interface format for displaying the type of information to one or more roles;
    based on determining that a role associated with the user matches the one or more roles identified by the view definition record, accessing, by the computer system, the user interface format identified by the view definition record;
    generating, by the computer system, based on the accessed user interface format, a graphical interface that displays information obtained from the data stored for the object, wherein the graphical interface displays the information according to the type of information indicated by the view definition record; and
    displaying, by the computer system, the generated graphical user interface.

2. The method of claim 1, further comprising:
    retrieving, from a repository system, an entity corresponding to the object, wherein the entity includes the data stored for the object, and wherein the object is identified in a request to display the information about the object.

3. The method of claim 1, further comprising:
    determining, based on the view definition record, whether the role associated with the user matches the one or more roles identified by the view definition record.

4. The method of claim 3, wherein the view definition record is a first view definition record, wherein the type of information is a first type of information, wherein the user interface format is a first user interface format, wherein the graphical interface is a first graphical interface, and wherein the method further comprises:
    upon determining that the role associated with the user does not match the one or more roles identified by the view definition record:
        determining, based on the type of object, a second view definition record, wherein the second view definition record indicates a second type of information to display from the data stored for the object, and wherein the second view definition record identifies a second user interface format for displaying the second type of information to the one or more roles; and
        generating, based on the second user interface format, a second graphical user interface that displays the information obtained from the data stored for the object, wherein the second graphical interface displays the information according to the second type of information indicated by the second view definition record.

5. The method of claim 1, further comprising:
determining the type of information to display from the data stored for the object, wherein the type of information is determined based on one or more criteria from the view definition record.

6. The method of claim 5, wherein the view definition record indicates one or more types of entities for which data may be displayed.

7. The method of claim 5, wherein the one or more criteria may include criteria of a query language.

8. The method of claim 1, wherein the view definition record may include location information for one or more elements of a user interface to be included in the graphical interface generated based on the view definition record.

9. The method of claim 1, wherein the view definition record may include one or more artifacts of a user interface to be included in the graphical interface generated based on the view definition record, and wherein the one or more artifacts include a task flow, a page definition, a page fragment, or a combination thereof.

10. The method of claim 1, wherein the view definition record may include one or more attributes of the user interface format.

11. A system comprising:
one or more processors; and
one or more memory accessible to the one or more processors, the one or more memory storing one or more instructions that, when upon execution by the one or more processors, cause the one or more processors to perform operations to:
determine a type of object associated with an object to be displayed for a user;
determine, based on the type of object, a view definition record, wherein the view definition record indicates a type of information to display from data stored for the object, wherein the type of information is based on the type of object, and wherein the view definition record identifies a user interface format for displaying the type of information to one or more roles;
based on determining that a role associated with the user matches the one or more roles identified by the view definition record, access the user interface format identified by the view definition record;
generate, based on the accessed user interface format, a graphical interface that displays information obtained from the data stored for the object, wherein the graphical interface displays the information according to the type of information indicated by the view definition record; and
display, the generated graphical user interface.

12. The system of claim 11, wherein the one or more instructions that, upon execution by the one or more processors, further causes the one or more processors to perform operations to:
retrieve, from a repository system, an entity corresponding to the object, wherein the entity includes the data stored for the object, and wherein the object is identified in a request to display the information about the object.

13. The system of claim 11, wherein the view definition record is a first view definition record, wherein the type of information is a first type of information, wherein the user interface format is a first user interface format, wherein the graphical interface is a first graphical interface, and wherein the one or more instructions that, upon execution by the one or more processors, further causes the one or more processors to perform operations to:
determine, based on the view definition record, whether the role associated with the user matches the one or more roles identified by the view definition record; and
upon determining that the role associated with the user does not match the one or more roles identified by the view definition record:
determine, based on the type of object, a second view definition record, wherein the second view definition record indicates a second type of information to display from the data stored for the object, and wherein the second view definition record identifies a second user interface format for displaying the second type of information to the one or more roles; and
generate, based on the second user interface format, a second graphical user interface that displays the information obtained from the data stored for the object, wherein the second graphical interface displays the information according to the second type of information indicated by the second view definition record.

14. The system of claim 11, wherein the one or more instructions that, upon execution by the one or more processors, further causes the one or more processors to perform operations to:
determine the type of information to display from the data stored for the object, wherein the type of information is determined based on one or more criteria from the view definition record, wherein the view definition record indicates one or more types of entities for which data may be displayed, and wherein the one or more criteria may include criteria of a query language.

15. A computer-readable memory storing one or more instructions that, upon execution by one or more processors, causes the one or more processors to:
determine, a type of object associated with an object to be displayed for a user;
determine, based on the type of object, a view definition record, wherein the view definition record indicates a type of information to display from data stored for the object, wherein the type of information is based on the type of object, and wherein the view definition record identifies a user interface format for displaying the type of information to one or more roles;
based on determining that a role associated with the user matches the one or more roles identified by the view definition record, access the user interface format identified by the view definition record;
generate, based on the accessed user interface format, a graphical interface that displays information obtained from the data stored for the object, wherein the graphical interface displays the information according to the type of information indicated by the view definition record; and
display the generated graphical user interface.

16. The computer-readable memory of claim 15, wherein the view definition record is a first view definition record, wherein the type of information is a first type of information, wherein the user interface format is a first user interface format, wherein the graphical interface is a first graphical interface, and wherein the one or more instructions that, upon execution by the one or more processors, further causes the one or more processors to:

determine, based on the view definition record, whether the role associated with the user matches the one or more roles identified by the view definition record; and upon determining that the role associated with the user does not match the one or more roles identified by the view definition record:

determine, based on the type of object, a second view definition record, wherein the second view definition record indicates a second type of information to display from the data stored for the object, and wherein the second view definition record identifies a second user interface format for displaying the second type of information to the one or more roles; and generate, based on the second user interface format, a second graphical user interface that displays the information obtained from the data stored for the object, wherein the second graphical interface displays the information according to the second type of information indicated by the second view definition record.

17. The computer-readable memory of claim 15, wherein the view definition record may include one or more artifacts of a user interface to be included in the graphical interface generated based on the view definition record, and wherein the one or more artifacts include a task flow, a page definition, a page fragment, or a combination thereof.

18. The computer-readable memory of claim 15, wherein the view definition record may include location information for one or more elements of a user interface to be included in the graphical interface generated based on the view definition record.

19. The computer-readable memory of claim 15, wherein the view definition record may include one or more attributes of the user interface format.

20. The computer-readable memory of claim 15, determining the type of information to display from the data stored for the object, wherein the type of information is determined based on one or more criteria from the view definition record.

* * * * *

UNITED STATES PATENT AND TRADEMARK OFFICE
CERTIFICATE OF CORRECTION

| | | |
|---|---|---|
| PATENT NO. | : 10,331,463 B2 | Page 1 of 1 |
| APPLICATION NO. | : 15/382699 | |
| DATED | : June 25, 2019 | |
| INVENTOR(S) | : Radhakrishnan et al. | |

It is certified that error appears in the above-identified patent and that said Letters Patent is hereby corrected as shown below:

In the Drawings

On sheet 1 of 14, in FIG. 1, under Reference Numeral 110, Line 1, delete "REPOSTIORY" and insert -- REPOSITORY --, therefor.

On sheet 5 of 14, in FIG. 5, under Reference Numeral 522, Line 1, delete "Deploymens" and insert -- Deployments --, therefor.

In the Specification

In Column 17, Line 67, delete "XML," and insert -- XML --, therefor.

Signed and Sealed this
Twenty-first Day of July, 2020

Andrei Iancu
*Director of the United States Patent and Trademark Office*